US012619886B2

(12) United States Patent
Vu et al.

(10) Patent No.: US 12,619,886 B2
(45) Date of Patent: May 5, 2026

(54) FROZEN MODEL ADAPTATION THROUGH SOFT PROMPT TRANSFER

(71) Applicant: Google LLC, Mountain View, CA (US)

(72) Inventors: Tu Thanh Vu, Amherst, MA (US); Daniel Matthew Cer, Santa Clara, CA (US); Noah Constant, Los Angeles, CA (US); Brian David Lester, Mountain View, CA (US); Rami Al-Rfou, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 718 days.

(21) Appl. No.: 17/863,840

(22) Filed: Jul. 13, 2022

(65) Prior Publication Data

US 2024/0020546 A1 Jan. 18, 2024

(51) Int. Cl.
| | |
|---|---|
| *G06N 3/096* | (2023.01) |
| *G06N 3/09* | (2023.01) |
| *G06N 5/022* | (2023.01) |
| G06N 3/084 | (2023.01) |

(52) U.S. Cl.
CPC .................................... *G06N 5/022* (2013.01)

(58) Field of Classification Search
CPC ................................. G06N 3/08; G06N 3/096
See application file for complete search history.

(56) References Cited

U.S. PATENT DOCUMENTS

2022/0188621 A1* 6/2022 Narayanan ............. G06N 3/045

OTHER PUBLICATIONS

Afridi, Muhammad Jamal et al.; "On automated source selection for transfer learning in convolutional neural networks"; 2018; Elsevier Pattern Recognition 73 (2018); 65-75 (Year: 2018).*
Fu, Chenbo et al.; "NES-TL: Network Embedding Similarity-Based Transfer Learning"; 2020; IEEE Transactions on Network Science and Engineering vol. 7 No. 3; 1607-1618 (Year: 2020).*
Zhong, Yang et al.; "Regularizing CNN Transfer Learning with Randomised Regression"; Apr. 2020; arXiv; 1-16 (Year: 2020).*
You, Kalchao et al.; "Co-Tuning for Transfer Learning"; 2020; NeurIPS2020; 1-11 (Year: 2020).*
Hacker Earth "Transfer Learning Introduction" [online]; May 2021; Retrieved from Internet <URL: https://hackerearth.com/practice/machine-learning/transfer-learning/transfer-learning-intro/tutorial/> (Year: 2021).*
Moon, Seungwhan et al.; "Proactive Transfer Learning for Heterogeneous Feature and Label Spaces"; 2016; Springer International Publishing AG 2016, ECML PKDD 2016 Part II, LNAI 9852; 706-721 (Year: 2016).*

(Continued)

*Primary Examiner* — David Yi
*Assistant Examiner* — Ezra J Baker
(74) *Attorney, Agent, or Firm* — DORITY & MANNING P.A.

(57) ABSTRACT

Systems and methods for prompt tuning can utilize previously-learned prompts for the initialization of tuning for prompts on different tasks that may differ from the task associated with the previously-learned prompt. The prompt being utilized for initialization can be a generic prompt and/or may be a prompt selected based on a determined similarity between two or more task embeddings.

20 Claims, 11 Drawing Sheets

(56) References Cited

OTHER PUBLICATIONS

Chattopadhyay, Rita et al.; "Joint Transfer and Batch-mode Active Learning"; 2013; Proceedings of the 30th International Conference on Machine Learning, JMLR:W&CP vol. 27; 1-9 (Year: 2013).*

Tsimpoukelli, Maria et al.; "Multimodal Few-Shot Learning with Frozen Language Models"; Jul. 2021; arXiv; 1-19 (Year: 2021).*

Sanh, Victor et al.; "Multitask Prompted Training Enables Zero-Shot Task Generalization"; Oct. 2021; arXiv ; 1-161 (Year: 2021).*

Asai, Akari et al.; "Attentional Mixtures of Soft Prompt Tuning for Parameter-efficient Multi-task Knowledge Sharing"; May 2022; arXiv; 1-18 (Year: 2022).*

Ben-Zaken et al, "Bitfit: Simple Parameter-Efficient Fine-Tuning for Transformer-Based Masked Language-Models", arXiv:2106.10199v4, Mar. 19, 2022, 9 pages.

Bhagavatula et al, "Abductive Commonsense Reasoning", arXiv:1908.05739v2, Feb. 14, 2020, 18 page.

Bingel et al, "Identifying Beneficial Task Relations for Multi-Task Learning in Deep Neural Networks", arXiv:1702.08303v1, Feb. 27, 2017, 6 pages.

Bisk et al, "PIQA: Reasoning about Physical Commonsense in Natural Language", arXiv:1911.11641v1, Nov. 26, 2019, 9 pages.

Bojar et al, "Findings of the 2014 Workshop on Statistical Machine Translation" Ninth Workshop on Statistical Machine Translation, Jun. 2014, Baltimore, Maryland, United States, 47 pages.

Bojar et al, "Findings of the 2015 Workshop on Statistical Machine Translation", Tenth Workshop on Statistical Machine Translation, Sep. 2015, Lisbon, Portugal, 46 pages.

Bojar et al, "Findings of the 2016 Conference on Machine Translation", First Conference on Machine Translation, Aug. 2016, Berlin, Germany, 68 pages.

Bowman et al, "A Large Annotated Corpus for Learning Natural Language Inference", arXiv:1508.05326v1, Aug. 21, 2015, 11 pages.

Brown et al, "Language Models are Few-Shot Learners", arXiv:2005.14165v4, Jul. 22, 2020, 75 pages.

Cer et al, "SemEval-2017 Task 1: Semantic Textual Similarity Multilingual and Crosslingual Focused Evaluation", arXiv:1708.00055V1, Jul. 31, 2017, 14 pages.

Clark et al, "BoolQ: Exploring the Surprising Difficulty of Natural Yes/No Questions", arXiv:1905.10044v1, May 24, 2019, 13 pages.

Dagan et al, "The PASCAL Recognising Textual Entailment Challenge", International Conference on Machine Learning Challenges: Evaluating Predictive Uncertainty Visual Object Classification, and Recognizing Textual Entailment, Apr. 11-13, 2005, Southampton, United Kingdom, 14 pages.

Demszky et al, "GoEmotions: A Dataset of Fine-Grained Emotions", 58th Annual Meeting of the Association for Computational Linguistics, Jul. 5-10, 2020, Virtual, pp. 4040-4054.

Devlin et al, "BERT: Pre-Training of Deep Bidirectional Transformers for Language Understanding", arXiv:1810.04805v2, May 24, 2019, 16 pages.

Dolan et al, "Automatically Constructing a Corpus of Sentential Paraphrases", Third International Workshop on Paraphrasing, 2005, 8 pages.

Dua et al, "DROP: A Reading Comprehension Benchmark Requiring Discrete Reasoning Over Paragraphs", arXiv:1903.00161v2, Apr. 16, 2019, 12 pages.

Dunn et al, "SearchQA: A New Q&A Dataset Augmented with Context from a Search Engine", arXiv:1704.05179v3, Jun. 11, 2017, 5 pages.

Dušek et al, "Semantic Noise Matters for Neural Natural Language Generation", arXiv:1911.03905v1, Nov. 10, 2019, 8 pages.

Fabbri et al, "Multi-News: A Large-Scale Multi-Document Summarization Dataset and Abstractive Hierarchical Model", arXiv:1906.01749V3, Jun. 19, 2019, 11 pages.

Fan et al, "Reducing Transformer Depth on Demand with Structured Dropout", arXiv:1909.11556v1, Sep. 25, 2019, 15 pages.

Fisch et al, "MRQA 2019 Shared Task: Evaluating Generalization in Reading Comprehension", arXiv:1910.09753v2, Dec. 20, 2019, 13 pages.

Gao et al, "Making Pre-Trained Language Models Better Few-Shot Learners", 59th Annual Meeting of the Association for Computational Linguistics and the 11th International Joint Conference on Natural Language Processing, Aug. 2021, Virtual, pp. 3816-3830.

Gardent et al, "Creating Training Corpora for NLG Micro-Planners", 55th Annual Meeting of the Association for Computational Linguistics, Jul. 2017, Vancouver, Canada, pp. 179-188.

Gehrmann, "The GEM Benchmark: Natural Language Generation, its Evaluation and Metrics", arXiv:2102.01672v3, Apr. 1, 2021, 27 pages.

Github, "Flax: A Neural Network Library and Ecosystem for JAX", https://github.com/google/flax, retrieved on Aug. 22, 2022, 6 pages.

Github, "JAX: composable transformations of Python+NumPy programs", https://github.com/google/jax, retrieved on Aug. 22, 2022, 13 pages.

Gliwa et al, "SAMSum corpus: A Human-Annotated Dialogue Dataset for Abstractive Summarization", arXiv:1911.12237v2, Nov. 29, 2019, 10 pages.

Go et al, Twitter Sentiment Classification using Distant Supervision. Stanford CS 224N Project Report, 2009.

Graff et al, "English Gigaword", Linguistic Data Consortium, https://catalog.ldc.upenn.edu/LDC2011T07, retrieved on Aug. 22, 2021, 2 pages.

Grusky et al, "Newsroom: A Dataset of 1.3 Million Summaries with Diverse Extractive Strategies", arXiv:1804.11283v2, May 17, 2020, 12 pages.

Gu et al, "PPT: Pre-Trained Prompt Tuning for Few-Shot Learning", arXiv:2109.04332v3, Mar. 14, 2022, 14 pages.

Hambardzumyan et al, "WARP: Word-level Adversarial ReProgramming", arXiv:2101.00121v2, Jun. 2, 2021, 13 pages.

He et al, "DeBERTta: Decoding-Enhanced BERT with Disentangled Attention", arXiv:2006.03654v6, Oct. 6, 2021, 23 pages.

Hermann et al, "Teaching Machines to Read and Comprehend", arXiv:1506.03340v3, Nov. 19, 2015, 14 pages.

Houlsby et al, "Parameter-Efficient Transfer Learning for NLP", arXiv:1902.00751v2, Jun. 13, 2019, 13 pages.

Hu et al, "LoRA: Low-Rank Adaptation of Large Language Models", arXiv:2106.09685V2, Oct. 16, 2021, 26 pages.

Hu et al, "Mining and Summarizing Customer Reviews", International Conference on Knowledge Discovery and Data Mining, Aug. 22-25, 2004, Seattle, Washington, United States, 10 pages.

Huang et al, "Cosmos QA: Machine Reading Comprehension with Contextual Commonsense Reasoning", arXiv:1909.00277v2, Sep. 6, 2019, 13 pages,.

Jiang et al, "How Can We Know What Language Models Know?", arXiv:1911.12543v2, May 3, 2020, 15 pages.

Jiang et al, "Neural CRF Model for Sentence Alignment in Text Simplification", Annual Meeting of the Association for Computational Linguistics, Jul. 5-10, 2020, Virtual, pp. 7943-7960.

Jiao et al, "TinyBERT: Distilling BERT for Natural Language Understanding", Findings of the Association for Computational Linguistics, 2020, pp. 4163-4174.

Joshi, et al, "TriviaQA: A Large Scale Distantly Supervised Challenge Dataset for Reading Comprehension", arXiv:1705.03551v2, May 13, 2017, 11 pages.

Khashabi et al, "Looking Beyond the Surface: A Challenge Set for Reading Comprehension Over Multiple Sentences", Conference of the North American Chapter of the Association for Computational Linguistics: Human Language Technologies, Jun. 1-6, 2018, New Orleans, Louisiana, United States, pp. 252-262.

Komilova et al, "BillSum: A Corpus for Automatic Summarization of US Legislation", arXiv:1910.00523v2, Dec. 4, 2019, 9 pages.

Kwiatkowski et al, "Natural Questions: A Benchmark for Question Answering Research", Topology, Algebra, and Categories in Logic, Jun. 17-21, 2019, Nice, France, pp. 453-466.

Ladhak et al, "WikiLingua: A New Benchmark Dataset for Cross-Lingual Abstractive Summarization", Conference on Empirical Methods in Natural Language Processing, Nov. 16-20, 2020, Virtual, pp. 4034-4048.

Lai et al, "RACE: Large-Scale Reading Comprehension Dataset from Examinations", arXiv:1704.04683v5, Dec. 5, 2017, 11 pages.

(56) References Cited

OTHER PUBLICATIONS

Lan et al, "ALBERT: A Lite BERT for Self-Supervised Learning of Language Representations", arXiv:1909.11942v6, Feb. 9, 2020, 17 pages.

Lester et al, "The Power of Scale for Parameter-Efficient Prompt Tuning", arXiv:2104.08691v2, Sep. 2, 2021, 15 pages.

Levesque et al, "The Winograd Schema Challenge", International Conference on Principles of Knowledge Representation and Reasoning, Jun. 10-14, 2012, Rome, Italy, p. 552-561.

Li et al, "Prefix-Tuning: Optimizing Continuous Prompts for Generation", Annual Meeting of the Association for Computational Linguistics and International Joint Conference on Natural Language Processing, Aug. 2021, Virtual, pp. 4582-4597.

Lin et al, "CommonGen: A Constrained Text Generation Challenge for Generative Commonsense Reasoning", arXiv:1911.03705v4, Nov. 30, 2020, 18 pages.

Liu et al, "GPT Understands, Too", arXiv:2103.10385v1, Mar. 18, 2021, 10 pages.

Liu et al, "Linguistic Knowledge and Transferability of Contextual Representations", arXiv:1903.08855v5, Apr. 25, 2019, 22 pages.

Liu et al, "Pretrain, Prompt, and Predict: A Systematic Survey of Prompting Methods in Natural Language Processing", arXiv:2107.13586v1, Jul. 28, 2021, 46 pages.

Liu et al, "RoBERTa: A Robustly Optimized BERT Pretraining Approach", arXiv:1907.11692v1, Jul. 26, 2019, 13 pages.

Lourie et al, "Unicorn on Rainbow: A Universal Commonsense Reasoning Model on a New Multitask Benchmark", Conference on Artificial Intelligence, Feb. 2-9, 2021, Virtual, pp. 13480-13488.

Mahabadi et al, "Compacter: Efficient Lowrank Hypercomplex Adapter Layers", arXiv:2106.04647v2, Nov. 27, 2021, 18 pages.

Mahabadi et al, "Parameter-Efficient Multi-Task Fine-Tuning for Transformers via Shared Hypernetworks", Annual Meeting of the Association for Computational Linguistics and International Joint Conference on Natural Language Processing, Aug. 1-6, 2021, Bangkok, Thailand, pp. 565-576.

Marneffe et al, The CommitmentBank: Investigating Projection in Naturally Occurring Discourse. In Proceedings of Sinn und Bedeutung, vol. 23, pp. 107-124.

Nan et al, "DART: Open-Domain Structured Data Record to Text Generation", arXiv:2007.02871v2, Apr. 12, 2021, 16 pages.

Narayan et al, "Don't Give Me the Details, Just the Summary! Topic-Aware Convolutional Neural Networks for Extreme Summarization", arXiv:1808.08745v1, Aug. 27, 2018, 11 pages.

Nie et al, "Adversarial NLI: A New Benchmark for Natural Language Understanding", arXiv:1910.14599v2, May 6, 2020, 17 pages.

Parekh et al, "Crisscrossed Captions: Extended Intramodal and Intermodal Semantic Similarity Judgments for MS-COCO", arXiv:2004.15020v3, Mar. 24, 2021, 16 pages.

Phang et al, "Sentence Encoders on STILTs: Supplementary Training on Intermediate Labeled-Data Tasks", arXiv:1811.01088v2, Feb. 27, 2019, 12 pages.

Pilehvar et al, WiC: the Word-In-Context Dataset for Evaluating Context-Sensitive Meaning Representations, arXiv:1808.09121v3, Apr. 27, 2019, 7 pages.

Poth et al, "What to Pre-Train on? Efficient Intermediate Task Selection", arXiv:2104.08247v2, Sep. 10, 2021, 21 pages.

Pruksachatkun et al, "Intermediate-Task Transfer Learning with Pretrained Language Models: When and Why Does it Work?", arXiv:2005.00628v2, May 9, 2020, 17 pages.

Qin et al, "Learning How to Ask: Querying LMs with Mixtures of Soft Prompts", arXiv:2104.06599v1, Apr. 14, 2021, 11 pages.

Quora, "First Quora Dataset Release: Question Pairs", https://quoradata.quora.com/First-Quora-Dataset-Release-Question-Pairs, retrieved on Aug. 23, 2022, 3 pages.

Raffel et al, "Exploring the Limits of Transfer Learning with a Unified Text-to-Text Transformer", arXiv:1910.10683v3, Jul. 28, 2020, 67 pages.

Rajpurkar et al, "SQUAD: 100,000+ Questions for Machine Comprehension of Text", arXiv:1606.05250v3, Oct. 11, 2016, 10 pages.

Rastogi et al, "Towards Scalable Multi-Domain Conversational Agents: The Schema-Guided Dialogue Dataset", Conference on Artificial Intelligence, Feb. 7-12, 2020, New York, New York, United States, 8689-8696.

Roemmele et al, "Choice of Plausible Alternatives: An Evaluation of Commonsense Causal Reasoning", Association for the Advancement of Artificial Intelligence Spring Symposium, Mar. 21-23, 2011, Palo Alto, California, United States, 6 pages.

Rush et al, "A Neural Attention Model for Abstractive Sentence Summarization", arXiv:1509.00685v2, Sep. 3, 2015, 11 pages.

Sakaguchi et al, "Winogrande: An Adversarial Winograd Schema Challenge at Scale", Conference on Artificial Intelligence, Feb. 7-12, 2020, New York, New York, United States, pp. 8732-8740.

Sanh et al, "DistilBERT, a Distilled Version of BERT: Smaller, Faster, Cheaper and Lighter", arXiv:1910.01108v4, Mar. 1, 2020, 5 pages.

Sanh et al, "Movement Pruning: Adaptive Sparsity by Fine-Tuning", Conference on Neural Information Processing Systems, Dec. 6-12, 2020, Virtual, 12 pages.

Sap et al, "Social IQa: Commonsense Reasoning About Social Interactions", arXiv:1904.09728v3, Sep. 9, 2019, 11 pages.

Schick et al, "It's Not Just Size That Matters: Small Language Models are Also Few-Shot Learners", arXiv:2009.07118v2, Apr. 12, 2021, 14 pages.

See et al, "Get To The Point: Summarization with Pointer-Generator Networks", arXiv:1704.04368v2, Apr. 25, 2017, 20 pages.

Shazeer et al, "Adafactor: Adaptive Learning Rates with Sublinear Memory Cost", arXiv:1804.04235v1, Apr. 11, 2018, 9 pages.

Shin et al, "AutoPrompt: Eliciting Knowledge from Language Models with Automatically Generated Prompts", Conference on Empirical Methods in Natural Language Processing, Nov. 16-20, 2020, Virtual, pp. 4222-4235.

Socher et al, "Recursive Deep Models for Semantic Compositionality over a Sentiment Treebank", Conference on Empirical Methods in Natural Language Processing, Oct. 18-21, 2013, Seattle, Washington, United States, pp. 1631-1642.

Talmor et al, "MultiQA: An Empirical Investigation of Generalization and Transfer in Reading Comprehension", Annual Meeting of the Association for Computational Linguistics, Jul. 28-Aug. 2, 2019, Florence, Italy, pp. 4911-4921.

Trischler et al, "NewsQA: A Machine Comprehension Dataset" arXiv:1611.09830v3, Feb. 7, 2017, 14 pages.

Vu et al, "Exploring and Predicting Transferability Across NLP Tasks", arXiv:2005.00770v2, Oct. 6, 2020, 45 pages.

Vu et al, "STraTA: Self-Training with Task Augmentation for Better Few-Shot Learning", arXiv:2109.06270v2, Apr. 12, 2022, 17 pages.

Wang et al, "Can You Tell Me How to Get Past Sesame Street? Sentence-Level Pretraining Beyond Language Modeling", arXiv:1812.10860v5, Jul. 22, 2019, 18 pages.

Wang et al, "Glue: A Multi-Task Benchmark and Analysis Platform for Natural Language Understanding", arXiv:1804.07461v3, Feb. 22, 2019, 20 pages.

Wang et al, SuperGLUE: A Stickier Benchmark for General-Purpose Language Understanding Systems. Conference on Neural Information Processing Systems, Nov. 28-Dec. 9, 2019, Vancouver, Canada, 15 pages.

Warstadt et al, "Neural Network Acceptability Judgments", Topology, Algebra, and Categories in Logic, Jun. 17-21, 2019, Nice, France, pp. 625-641.

Williams et al, "A Broad-Coverage Challenge Corpus for Sentence Understanding through Inference", arXiv:1704.05426v4, Feb. 19, 2018, 11 pages.

Yang et al, "HotpotQA: A Dataset for Diverse, Explainable Multi-Hop Question Answering", arXiv:1809.09600v1, Sep. 25, 2018, 12 pages.

Yang et al, "XLNet: Generalized Autoregressive Pretraining for Language Understanding", Conference on Neural Information Processing Systems, Nov. 28-Dec. 9, 2019, Vancouver, Canada, 11 pages.

Yin et al, "DocNLI: A Large-Scale Dataset for Document-Level Natural Language Inference", arXiv:2106.09449v1, Jun. 17, 2021, 10 pages.

(56)     References Cited

OTHER PUBLICATIONS

Zeller et al, "HellaSwag: Can a Machine Really Finish your Sentence?", Annual Meeting of the Association for Computational Linguistics, Jul. 28-Aug. 2, 2019, Florence, Italy, pp. 4791-4800.

Zhang et al, "Character-Level Convolutional Networks for Text Classification", Conference on Neural Information Processing Systems, Dec. 7-12, 2015, Montreal, Canada, 9 pages.

Zhang et al, "ReCoRD: Bridging the Gap Between Human and Machine Commonsense Reading Comprehension", arXiv:1810. 12885v1, Oct. 30, 2018, 14 pages.

Zhang et al, "This Email Could Save Your Life: Introducing the Task of Email Subject Line Generation", Annual Meeting of the Association for Computational Linguistics, Jul. 28-Aug. 2, 2019, Florence, Italy, pp. 446-456.

Zhao et al, "Calibrate Before Use: Improving Few-Shot Performance of Language Models", Conference on Machine Learning, Jul. 18-24, 2021, Virtual, 10 pages.

* cited by examiner

600

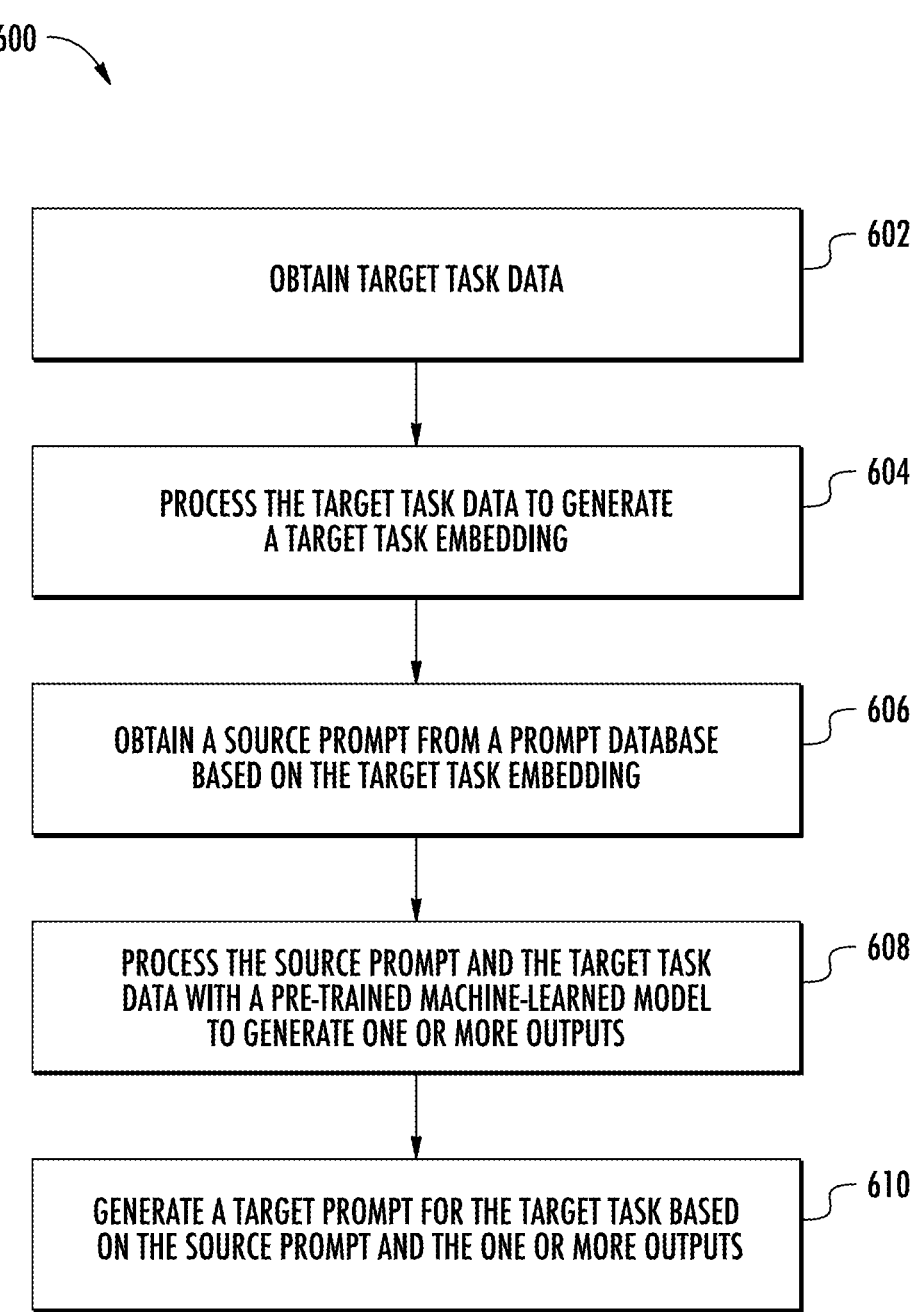

602

OBTAIN TARGET TASK DATA

604

PROCESS THE TARGET TASK DATA TO GENERATE
A TARGET TASK EMBEDDING

606

OBTAIN A SOURCE PROMPT FROM A PROMPT DATABASE
BASED ON THE TARGET TASK EMBEDDING

608

PROCESS THE SOURCE PROMPT AND THE TARGET TASK
DATA WITH A PRE-TRAINED MACHINE-LEARNED MODEL
TO GENERATE ONE OR MORE OUTPUTS

610

GENERATE A TARGET PROMPT FOR THE TARGET TASK BASED
ON THE SOURCE PROMPT AND THE ONE OR MORE OUTPUTS

FIG. 6

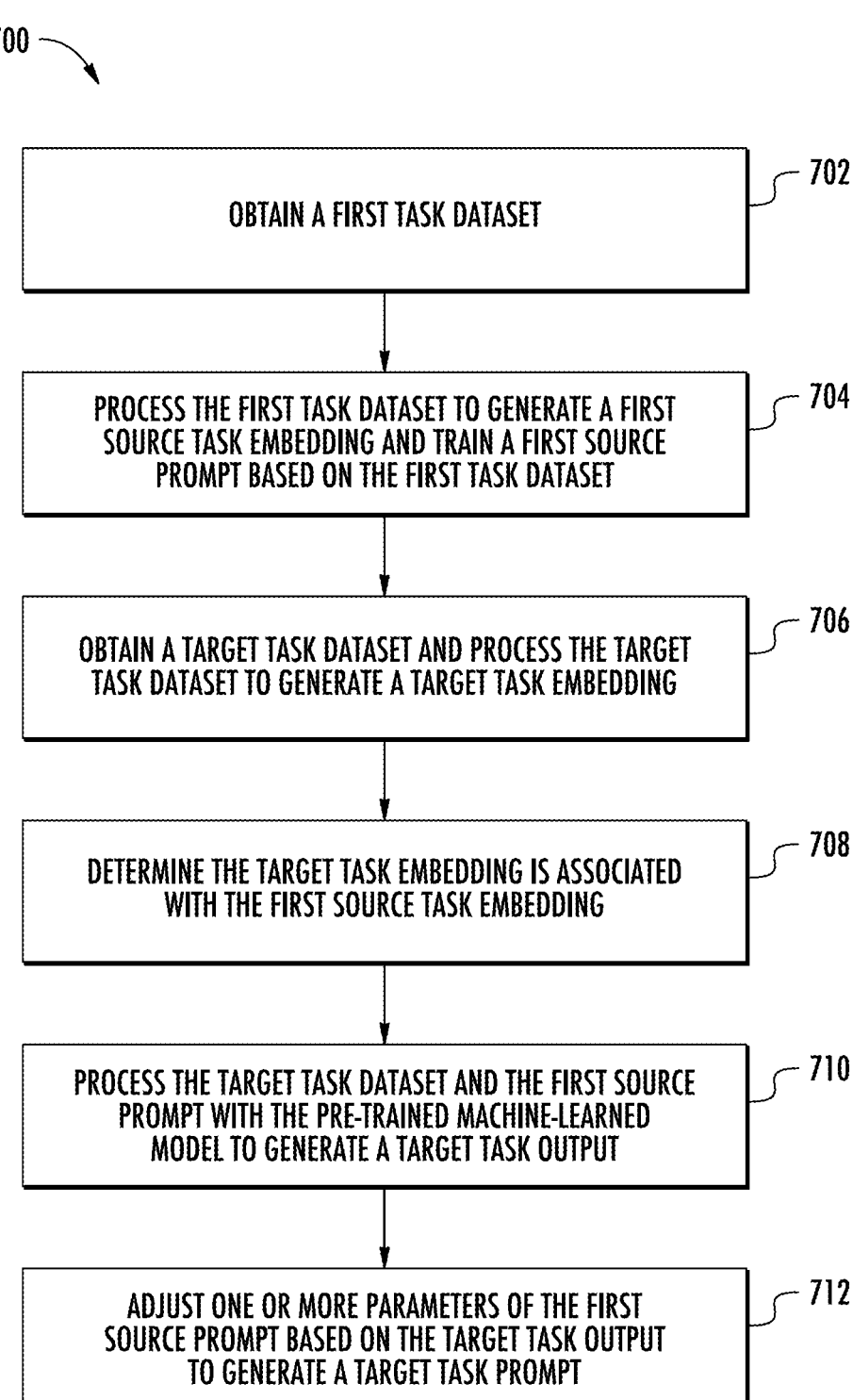

700

OBTAIN A FIRST TASK DATASET — 702

PROCESS THE FIRST TASK DATASET TO GENERATE A FIRST SOURCE TASK EMBEDDING AND TRAIN A FIRST SOURCE PROMPT BASED ON THE FIRST TASK DATASET — 704

OBTAIN A TARGET TASK DATASET AND PROCESS THE TARGET TASK DATASET TO GENERATE A TARGET TASK EMBEDDING — 706

DETERMINE THE TARGET TASK EMBEDDING IS ASSOCIATED WITH THE FIRST SOURCE TASK EMBEDDING — 708

PROCESS THE TARGET TASK DATASET AND THE FIRST SOURCE PROMPT WITH THE PRE-TRAINED MACHINE-LEARNED MODEL TO GENERATE A TARGET TASK OUTPUT — 710

ADJUST ONE OR MORE PARAMETERS OF THE FIRST SOURCE PROMPT BASED ON THE TARGET TASK OUTPUT TO GENERATE A TARGET TASK PROMPT — 712

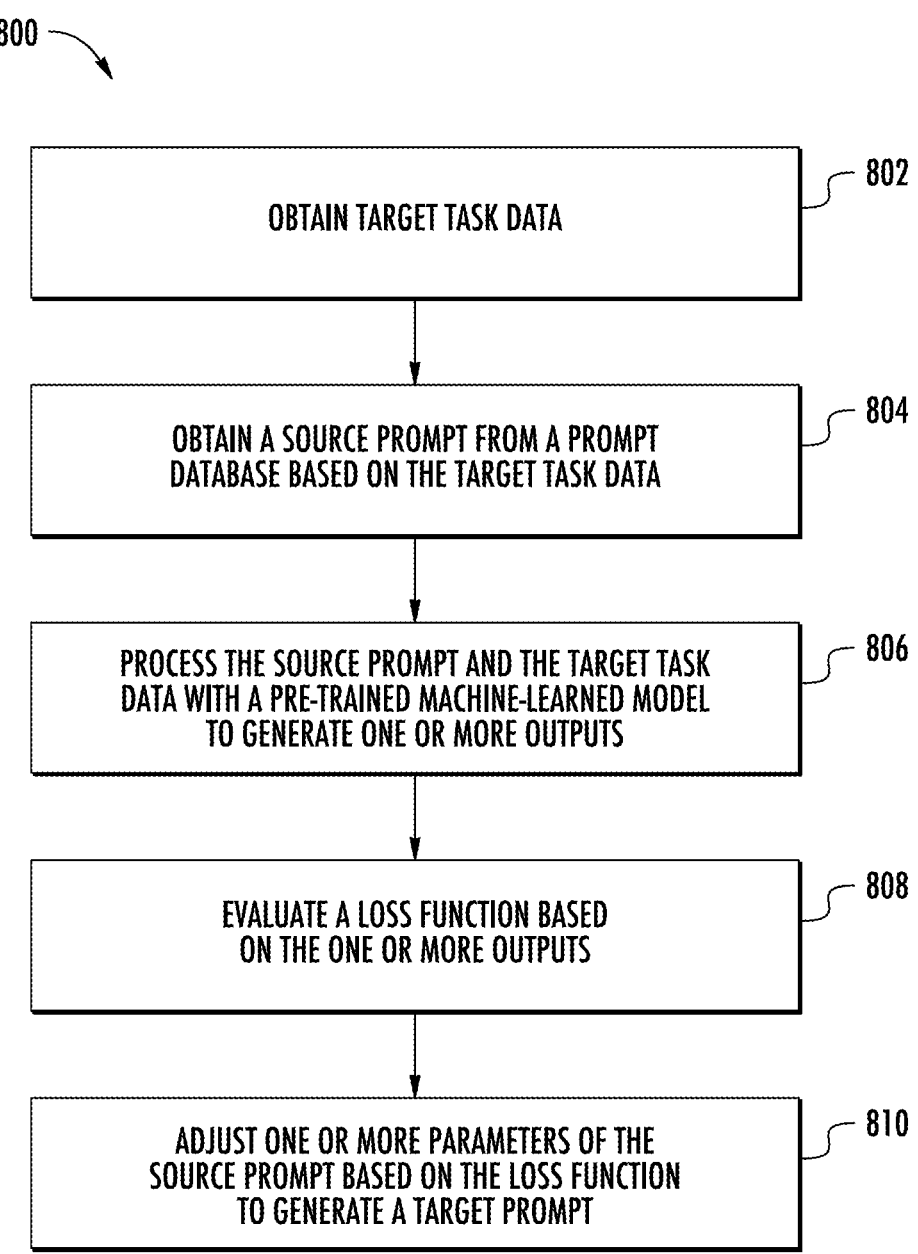

802 — OBTAIN TARGET TASK DATA

804 — OBTAIN A SOURCE PROMPT FROM A PROMPT DATABASE BASED ON THE TARGET TASK DATA

806 — PROCESS THE SOURCE PROMPT AND THE TARGET TASK DATA WITH A PRE-TRAINED MACHINE-LEARNED MODEL TO GENERATE ONE OR MORE OUTPUTS

808 — EVALUATE A LOSS FUNCTION BASED ON THE ONE OR MORE OUTPUTS

810 — ADJUST ONE OR MORE PARAMETERS OF THE SOURCE PROMPT BASED ON THE LOSS FUNCTION TO GENERATE A TARGET PROMPT

FIG. 8

FROZEN MODEL ADAPTATION THROUGH SOFT PROMPT TRANSFER

FIELD

The present disclosure relates generally to prompt tuning initialized by a pre-trained soft prompt. More particularly, the present disclosure relates to transfer learning of a set of parameters for a target task based on a pre-trained set of parameters for a previously-learned task.

BACKGROUND

Large pre-trained models can provide realistic outputs (e.g., realistic natural language outputs). However, training and retraining the large machine-learned models can be computationally expensive as the models can include billions of parameters. Additionally, efforts to condition inputs with alternative techniques provide reduced quality results while being tedious.

There are a plurality of tasks that the large pre-trained models may be useful for if trained or conditioned for the particular task. However, the training of the parameters of the model may not be feasible for general consumer computing devices. Therefore, the large pre-trained models may rely on being trained and retrained using the large computational resources that may not be readily accessible.

SUMMARY

Aspects and advantages of embodiments of the present disclosure will be set forth in part in the following description, or can be learned from the description, or can be learned through practice of the embodiments.

One example aspect of the present disclosure is directed to a computing system for soft prompt transfer-learning. The computing system can include one or more processors and one or more non-transitory computer-readable media that collectively store instructions that, when executed by the one or more processors, cause the computing system to perform operations. The operations can include obtaining target task data. The target task data can be associated with a target task for a machine-learned model. In some implementations, the target task data can include one or more target training examples and one or more target training labels. The operations can include processing the target task data to generate a target task embedding. The operations can include obtaining a source prompt from a prompt database based on the target task embedding. The source prompt can be associated with a previously-learned task. In some implementations, the source prompt can be associated with a source embedding. The operations can include processing the source prompt and the target task data with a pre-trained machine-learned model to generate one or more outputs. The operations can include generating a target prompt for the target task based on the source prompt and the one or more outputs.

In some implementations, generating the target prompt can include evaluating a loss function based on the one or more outputs and adjusting one or more parameters of the source prompt based on the loss function. The operations can include obtaining input data and processing the input data and the target prompt with the pre-trained machine-learned model to generate a target task output. In some implementations, the target task output can be associated with the target task. Processing the target task data to generate the target task embedding can include learning one or more embedding parameters based at least in part on the target task data. In some implementations, obtaining the source prompt from the prompt database based on the target task embedding can include determining the target task embedding is associated with the source embedding and obtaining the source prompt associated with the source embedding.

In some implementations, the source prompt may have been pre-trained on a plurality of different training datasets associated with a plurality of different tasks. The operations can include obtaining a first source task dataset. The first source task dataset can be associated with a first task. The operations can include generating a first source embedding based on the first source task dataset by partially training a plurality of first source parameters, generating a first source prompt based on the first source task dataset by further training the plurality of first source parameters, and storing the first source prompt and the first source embedding in the prompt database.

In some implementations, the operations can include obtaining a second source task dataset. The second source task dataset can be associated with a second task. The operations can include generating a second source embedding based on the second source task dataset by partially training a plurality of second source parameters, generating a second source prompt based on the second source task dataset by further training the plurality of second source parameters, and storing the second source prompt and the second source embedding in the prompt database.

In some implementations, obtaining the source prompt from the prompt database based on the target task embedding can include determining the first source embedding is more similar to the target task embedding than the second source embedding, determining the first source prompt is the source prompt based on the first source embedding being more similar to the target task embedding than the second source embedding, and obtaining the first source prompt from the prompt database. Obtaining the source prompt from the prompt database based on the target task embedding can include determining a particular source task embedding associated with the target task embedding based on a learned distribution associated with an embedding space.

Another example aspect of the present disclosure is directed to a computer-implemented method for prompt tuning. The method can include obtaining, by a computing system including one or more processors, a first task dataset. The first task dataset can be associated with a first task. The method can include processing, by the computing system, the first task dataset to generate a first source task embedding. The method can include training, by the computing system, a first source prompt based on the first task dataset. In some implementations, training the first source prompt can include processing, by the computing system, the first task dataset and a set of parameters with a pre-trained machine-learned model to generate a first task output and adjusting, by the computing system, one or more parameters of the set of parameters based on the first task output. The method can include obtaining, by the computing system, a target task dataset and processing, by the computing system, the target task dataset to generate a target task embedding. The method can include determining, by the computing system, the target task embedding is associated with the first source task embedding. The method can include processing, by the computing system, the target task dataset and the first source prompt with the pre-trained machine-learned model to generate a target task output. The method can include adjusting, by the computing system, one or more parameters of the first source prompt based on the target task output to generate a target task prompt.

In some implementations, the pre-trained machine-learned model can include a large frozen model. A plurality of pre-trained parameters for the pre-trained machine-learned model can be fixed during prompt tuning. In some implementations, the first task can be descriptive of a text completion task. The target task dataset can be associated with a target task, and the target task can be descriptive of a sentiment classification task. In some implementations, determining the target task embedding is associated with the first source task embedding can include generating a similarity score based on a similarity between the target task embedding and the first source task embedding.

Another example aspect of the present disclosure is directed to one or more non-transitory computer-readable media that collectively store instructions that, when executed by one or more computing devices, cause the one or more computing devices to perform operations. The operations can include obtaining target task data. The target task data can be associated with a target task for a machine-learned model. The operations can include obtaining a source prompt from a prompt database based on the target task data. The source prompt can include one or more learned parameters representative of a source task. In some implementations, the source prompt can be associated with a source embedding. The operations can include processing the source prompt and the target task data with a pre-trained machine-learned model to generate one or more outputs. In some implementations, the pre-trained machine-learned model can include a frozen language model. The operations can include evaluating a loss function based on the one or more outputs and adjusting one or more parameters of the source prompt based on the loss function to generate a target prompt.

In some implementations, obtaining the source prompt from the prompt database based on the target task data can include processing the target task data with an embedding model to generate a target task embedding, determining a nearest embedding neighbor for the target task embedding based on a plurality of embeddings stored in the prompt database, and determining the source prompt is associated with the nearest embedding neighbor. The source embedding and the source prompt may have been generated by training a plurality of source parameters based on a source task dataset associated with the source task. In some implementations, the target task can include an image classification task. The source task can differ from the target task. In some implementations, the target prompt can be configured to be processed with the pre-trained machine-learned model to perform a target task. The source prompt can be configured to be processed with the pre-trained machine-learned model to perform the source task. The operations can include storing the target prompt in the prompt database.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method to perform target prompt tuning based on source prompt initialization according to example embodiments of the present disclosure.

FIG. 7 depicts a flow chart diagram of an example method to perform soft prompt transfer tuning according to example embodiments of the present disclosure.

FIG. 8 depicts a flow chart diagram of an example method to perform target prompt tuning based on source prompt initialization according to example embodiments of the present disclosure.

Figure 1A:
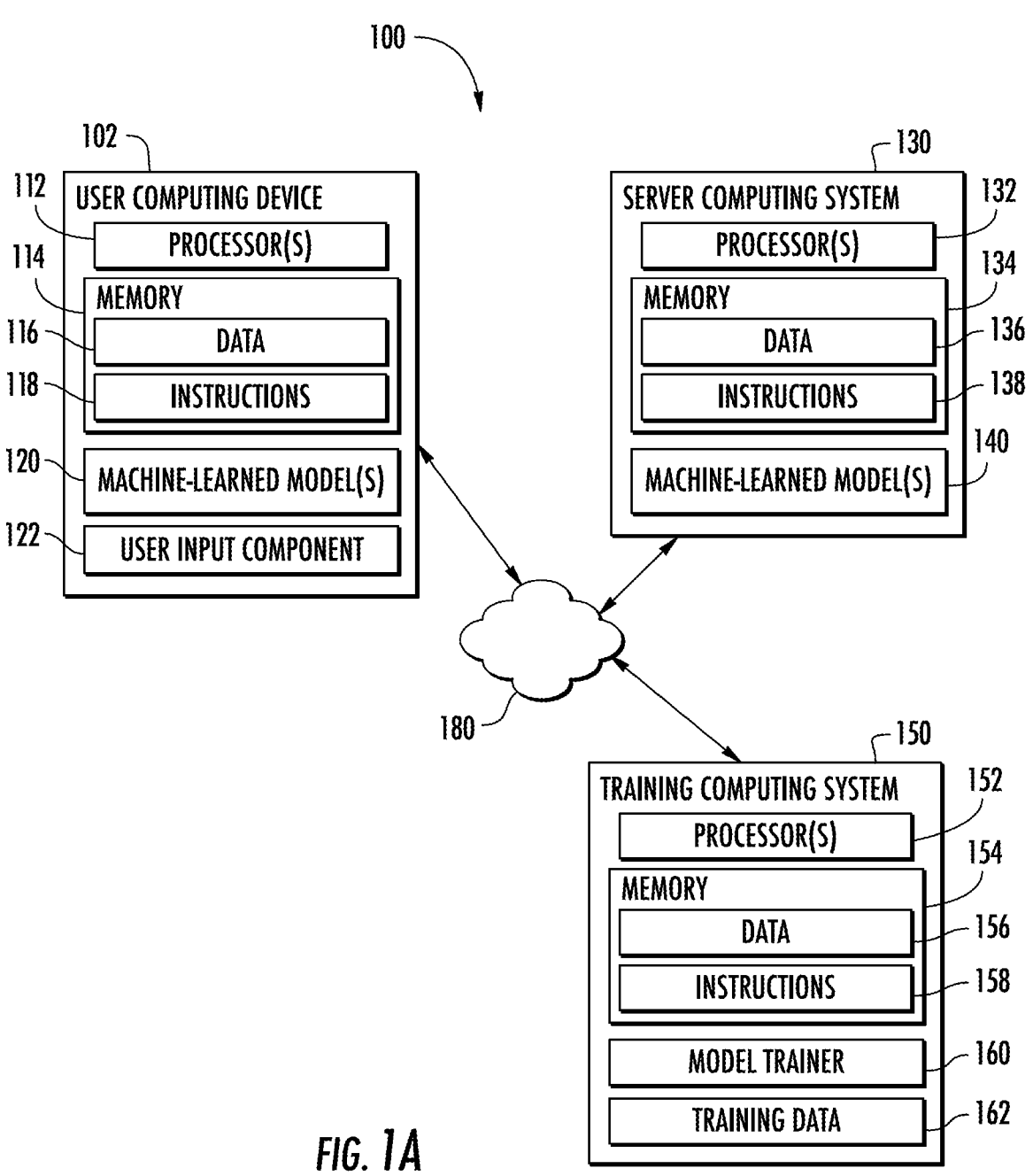
FIG. 1A depicts a block diagram of an example computing system that performs prompt transfer learning according to example embodiments of the present disclosure.

Reference numerals that are repeated across plural figures are intended to identify the same features in various implementations.

DETAILED DESCRIPTION

Overview

Generally, the present disclosure is directed to systems and methods for soft prompt tuning initialized based on a previously-learned prompt. In particular, the systems and methods disclosed herein can leverage a library of previously-learned soft prompts for the initialization of tuning a prompt for a target task. For example, the systems and methods disclosed herein can include obtaining target task data. In some implementations, the target task data can be associated with a target task for a machine-learned model. The target task data can include one or more target training examples and one or more target training labels. The target task data can be processed to generate a target task embedding. The systems and methods can include obtaining a source prompt from a prompt database based on the target task embedding. The source prompt can be associated with a previously-learned task. In some implementations, the source prompt can be associated with a source embedding. The source prompt and the target task data can be processed with a pre-trained machine-learned model to generate one or more outputs. The systems and methods can include generating a target prompt for the target task based on the source prompt and the one or more outputs.

The systems and methods can target task data. The target task data can be associated with a target task for a machine-learned model. In some implementations, the target task data can include one or more target training examples and one or more target training labels. The one or more target training examples and the one or more target training labels can be associated with the target task of the target task data. In some implementations, the target task data can include a plurality of target training examples and a plurality of target training labels selected as descriptive of the particular target task.

The target task data can be processed to generate a target task embedding. Processing the target task data to generate the target task embedding can include learning one or more embedding parameters based at least in part on the target task data. In some implementations, generating the target task embedding can include processing a target training example and an initial prompt with a pre-trained machine-learned model to generate a target training output. The target training output and the respective target training label for the target training example can be compared to evaluate a loss function to output a prompt gradient. The prompt gradient can be utilized to adjust one or more parameters of the initial prompt. The training can be repeated for a set number of training loops in order to generate the target task embedding.

The systems and methods can include obtaining a source prompt from a prompt database based on the target task embedding. The source prompt can be associated with a previously-learned task. In some implementations, the source prompt can be associated with a source embedding. The source prompt may have been pre-trained on a plurality of different training datasets associated with a plurality of different tasks. In some implementations, obtaining the source prompt from the prompt database based on the target task embedding can include determining a particular source task embedding associated with the target task embedding based on a learned distribution associated with an embedding space.

Alternatively and/or additionally, obtaining the source prompt from the prompt database based on the target task embedding can include determining the target task embedding is associated with the source embedding and obtaining the source prompt associated with the source embedding. The determination can be based on a learned distribution of an embedding space associated with the target task embedding and the source embedding. In some implementations, the determination can be based on a nearest neighbor determination.

The source prompt and the target task data can be processed with a pre-trained machine-learned model to generate one or more outputs. In some implementations, the source prompt can be utilized to condition the target task data before processing with the pre-trained machine-learned model. Alternatively and/or additionally, a target training example and the source prompt can be processed with a pre-trained machine-learned model to generate an output. The processing can occur for a plurality of target training examples of the target training examples of the target training data to generate a plurality of outputs.

The systems and methods can generate a target prompt for the target task based on the source prompt and the one or more outputs. Generating the target prompt can involve adjusting one or more parameters of the source prompt based on the one or more outputs. For example, the output from processing the target training example can be compared against the respective target training label in order to evaluate a loss function and output a prompt gradient that can be utilized to adjust the one or more parameters of the source prompt. The process can be repeated iteratively for each output of the plurality of outputs generated by processing the plurality of target training examples.

In some implementations, generating the target prompt can include evaluating a loss function based on the one or more outputs and adjusting one or more parameters of the source prompt based on the loss function.

Additionally and/or alternatively, the systems and methods can include obtaining input data and processing the input data and the target prompt with the pre-trained machine-learned model to generate a target task output. The target task output can be associated with the target task.

In some implementations, the systems and methods can include obtaining a first source task dataset. The first source task dataset can be associated with a first task. A first source embedding can be generated based on the first source task dataset by partially training a plurality of first source parameters. Additionally and/or alternatively, a first source prompt can be generated based on the first source task dataset by further training the plurality of first source parameters. The first source prompt and the first source embedding can then be stored in the prompt database.

Additionally and/or alternatively, the systems and methods can include obtaining a second source task dataset. The second source task dataset can be associated with a second task. A second source embedding can be generated based on the second source task dataset by partially training a plurality of second source parameters. In some implementations, a second source prompt can be generated based on the second source task dataset by further training the plurality of second source parameters. The systems and methods can be stored the second source prompt and the second source embedding in the prompt database.

In some implementations, obtaining the source prompt from the prompt database based on the target task embedding can include determining the first source embedding is more similar to the target task embedding than the second source embedding, determining the first source prompt is the source prompt based on the first source embedding being more similar to the target task embedding than the second source embedding, and obtaining the first source prompt from the prompt database.

The systems and methods can include pre-training source prompts that can then be utilized for initializing the tuning of new target prompts. For example, the systems and methods can include obtaining a first task dataset. The first task dataset can be associated with a first task. The first task dataset can be processed to generate a first source task embedding. The systems and methods can train a first source prompt based on the first task dataset. In some implementations, training the first source prompt can include processing the first task dataset and a set of parameters with a pre-trained machine-learned model to generate a first task output and adjusting one or more parameters of the set of parameters based on the first task output. Additionally and/or alternatively, the systems and methods can obtain a target task dataset. The target task dataset can be processed to generate a target task embedding. The target task embedding can be determined to be associated with the first source task embedding. In some implementations, the target task dataset and the first source prompt can be processed with the pre-trained machine-learned model to generate a target task output. The systems and methods can include adjusting one or more parameters of the first source prompt based on the target task output to generate a target task prompt.

The systems and methods can obtain a first task dataset. The first task dataset can be associated with a first task. In some implementations, the first task can be descriptive of a text completion task. Alternatively and/or additionally, the first task may be descriptive of a question-answer task (e.g., a question may be received and a response may be generated as output), an augmentation task, and/or a classification task (e.g., semantics classification, sentiment classification, and/or prose classification (e.g., poetry versus prose and/or young adult prose, Victorian era prose, romance prose, science fiction prose, etc.). The first task dataset can include a plurality of first training examples and a plurality of respective first training examples.

The first task dataset can be processed to generate a first source task embedding. Generating the first source task embedding can include partially training a set of parameters based on the first task dataset. In some implementations, a training example of the first task dataset and an initial prompt can be processed with a pre-trained machine-learned model to generate a first task output. The first task output can be compared against a respective training label of the first task dataset to evaluate a loss function and generate a prompt gradient. The prompt gradient can be utilized to adjust one or more parameters of the initial prompt. The process can be repeated for a plurality of first training examples in order to generate the first source task embedding.

The systems and methods can include training a first source prompt based on the first task dataset. Training the first source prompt can include processing the first task dataset and a set of parameters with a pre-trained machine-learned model to generate a first task output. The pre-trained machine-learned model can include a large frozen model. In some implementations, a plurality of pre-trained parameters for the pre-trained machine-learned model can be fixed during prompt tuning. Additionally and/or alternatively, training the first source prompt can include adjusting one or more parameters of the set of parameters based on the first task output. Training the first source prompt can include further adjusting the set of parameters of the first source task embedding. For example, a training example of the first task dataset and the first source task embedding can be processed with the pre-trained machine-learned model to generate a first task output. The first task output can be compared against a respective training label of the first task dataset to evaluate a loss function and generate a prompt gradient. The prompt gradient can then be backpropagated in order to adjust one or more parameters of the first source task embedding. The process can be completed for a plurality of training examples in order to generate the first source prompt.

The systems and methods can obtain a target task dataset. The target task dataset can be associated with a target task. In some implementations, the target task can be descriptive of a sentiment classification task. Alternatively and/or additionally, the target task can be descriptive of a text completion task, a question-answer task (e.g., a question may be received and a response may be generated as output), an augmentation task, and/or a classification task (e.g., semantics classification, sentiment classification, and/or prose classification (e.g., poetry versus prose and/or young adult prose, Victorian era prose, romance prose, science fiction prose, etc.). In some implementations, the target task dataset can include a plurality of target training examples and a plurality of respective target training labels.

The target task dataset can be processed to generate a target task embedding. Generating the target task embedding can include partially training a set of parameters based on the target task dataset. In some implementations, a training example of the target task dataset and an initial prompt can be processed with a pre-trained machine-learned model to generate a training target task output. The training target task output can be compared against a respective training label of the target task dataset to evaluate a loss function and generate a prompt gradient. The prompt gradient can be utilized to adjust one or more parameters of the initial prompt. The process can be repeated for a plurality of target training examples in order to generate the target task embedding.

The target task embedding can be determined to be associated with the first source task embedding. Determining the target task embedding is associated with the first source task embedding can include generating a similarity score based on a similarity between the target task embedding(s) and the first source task embedding(s). The similarity score can then be utilized to determine whether a respective source prompt of the first source task embedding will be used for initializing the training of a target task prompt.

The target task dataset and the first source prompt can be processed with the pre-trained machine-learned model to generate a target task output. For example, a target training example of the target task dataset and the first source prompt can be processed with the pre-trained machine-learned model to generate the target task output.

The systems and methods can adjust one or more parameters of the first source prompt based on the target task output to generate a target task prompt. For example, the target task output can be compared to a target training label of the target task dataset in order to evaluate a loss function and generate a prompt gradient. The prompt gradient can be backpropagated and utilized to adjust one or more parameters of the first source prompt. The training loop can be repeated for a plurality of training examples of the target task dataset in order to generate a plurality of prompt gradients, which can be utilized to adjust the parameters of the first source prompt and generate the target task prompt.

Alternatively and/or additionally, the systems and methods can include obtaining a target task data. The target task data can be associated with a target task for a machine-learned model. In some implementations, the systems and methods can include obtaining a source prompt from a prompt database based on the target task data. The source prompt can include one or more learned parameters representative of a source task. In some implementations, the source prompt can be associated with a source embedding. The source prompt and the target task data can be processed with a pre-trained machine-learned model to generate one or more outputs. The pre-trained machine-learned model can include a frozen language model. The systems and methods can include evaluating a loss function based on the one or more outputs and adjusting one or more parameters of the source prompt based on the loss function to generate a target prompt.

The systems and methods can obtain target task data. The target task data can be associated with a target task for a machine-learned model. In some implementations, the target task can include an image classification task, a sentiment classification task, a semantics classification task, a text completion task, a question-answer task, an augmentation task, and/or summarization task.

The systems and methods can obtain a source prompt from a prompt database based on the target task data. The source prompt can include one or more learned parameters representative of a source task. In some implementations, the source prompt can be associated with a source embedding. Additionally and/or alternatively, a target task embedding can be generated by processing one or more training examples of the target task dataset and an initial set of parameters with a pre-trained machine-learned model to generate one or more initial outputs, which can be utilized to adjust one or more parameters of the initial set of parameters to generate the target task embedding. A similar generation loop can be completed for one or more training examples of a source task dataset in order to generate source embedding. The source prompt may be obtained in response to a similarity between the target task embedding and the source embedding.

In some implementations, obtaining the source prompt from the prompt database based on the target task data can include processing the target task data with an embedding model to generate a target task embedding, determining a nearest embedding neighbor for the target task embedding based on a plurality of embeddings stored in the prompt database, and determining the source prompt is associated with the nearest embedding neighbor. The source embedding and the source prompt may have been generated by training a plurality of source parameters based on a source task dataset associated with the source task.

The source prompt and the target task data can be processed with a pre-trained machine-learned model to generate one or more outputs. The pre-trained machine-learned model can include a frozen language model (e.g., the parameters of the language model may be fixed as the parameters of the source prompt and/or the target prompt are being learned).

The systems and methods can include evaluating a loss function based on the one or more outputs. The loss function can be a ground truth loss function that determines the differences between the one or more outputs and one or more ground truth labels.

Additionally and/or alternatively, the systems and methods can include adjusting one or more parameters of the source prompt based on the loss function to generate a target prompt. For example, the source prompt can be utilized as an initialization point for the generation of the target prompt such that the parameters of the source prompt can be adjusted in order to build upon pre-existing training.

In some implementations, the target prompt can be stored in the prompt database. The target prompt and a target task embedding may be stored in the prompt database to utilize the target prompt for the initialization of training for new prompts associated with new tasks.

In some implementations, the generation of an embedding can include partially training a prompt. For example, a set portion of the training dataset can be utilized for training the parameters of the embedding. The whole training dataset can then be utilized for training the parameters for prompt generation. In some implementations, the embedding can be generated by training the parameters of the embedding on the whole dataset; however, the number of training loops may be limited, while prompt generation may include a plurality of additional training loops.

The training datasets can include a plurality of training examples and a plurality of training labels associated with one or more tasks. The training examples can include text data (e.g., one or more words (e.g., a question, a paragraph, words for association or matching, etc.)), image data (e.g., an image for augmentation and/or classification, a video, and/or an animated image), audio data (e.g., soundwave data, a command, etc.), and/or latent encoding data. The training labels can be associated with a ground truth classification, a ground truth output, and/or data for identifying an accurate and/or preferred output.

The outputs for the pre-trained machine-learned model can include text data, audio data, image data, and/or latent encoding data. In some implementations, the outputs can be descriptive of a response, a classification, a summarization, an augmentation of the input data, and/or a representation of the input data (e.g., an image representation of a body of text).

The pre-trained machine-learned model can then be utilized to process the generated prompts to perform specific tasks. For example, the pre-trained machine-learned model can process input data and a first prompt to generate first output associated with a first task, and the pre-trained machine-learned model can process input data and a second prompt to generate a second output associated with a second task. In some implementations, the systems and methods disclosed herein can utilize a single pre-trained machine-learned model to perform a plurality of different tasks at a level of per task accuracy that matches model-fine tuning but with minimal additional memory being needed for each individual task.

The systems and methods of the present disclosure provide a number of technical effects and benefits. As one example, the system and methods can be utilized to learn a plurality of soft prompts for a plurality of different tasks. The different soft prompts can be paired with their respective task to allow for conditioning pre-trained machine-learned models for specific tasks by selecting a particular soft prompt. Additionally and/or alternatively, the soft prompts can be paired with their respective task embeddings and stored in a prompt database. The learned soft prompt and the task embedding can then be utilized for initializing the training of new soft prompts for new tasks. For example, the systems and methods can determine a particular soft prompt to utilize for initialization of new prompt tuning based on a determined similarity between task embeddings.

Another example technical effect and benefit relates to improved computational efficiency and improvements in the functioning of a computing system. For example, a technical benefit of the systems and methods of the present disclosure is the ability to reduce the computational resources needed for training and using a pre-trained machine-learned model system. In particular, prompt tuning can allow for the circumvention of retraining the full pre-trained machine-learned model. The systems and methods disclosed herein can allow for the focused training of only a subset of parameters for the specific task. For example, instead of retraining the parameters of a model for each new task, the systems and methods disclosed herein can train a prompt for each task, in which each of the plurality of prompts can individually and/or in combination be input into the same pre-trained machine-learned model to generate an output specific for the task. Therefore, instead of having to train billions of parameters of a model for each new task, a user can train tens of thousands of parameters of a soft prompt which can then utilize the billions of pre-trained parameters of the pre-trained machine-learned model. The soft prompt transfer learning can further improve the conditioning and output while maintaining the computational efficiency advantages of the prompt tuning.

With reference now to the Figures, example embodiments of the present disclosure will be discussed in further detail.

Example Devices and Systems

FIG. 1A depicts a block diagram of an example computing system 100 that performs soft prompt transfer learning according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more pre-trained machine-learned models 120. For example, the pre-trained machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example pre-trained machine-learned models 120 are discussed with reference to FIGS. 2-3 & 5.

In some implementations, the one or more pre-trained machine-learned models 120 can be received from the server computing system 130 over network 180, stored in the user computing device memory 114, and then used or otherwise implemented by the one or more processors 112. In some implementations, the user computing device 102 can implement multiple parallel instances of a single pre-trained machine-learned model 120 (e.g., to perform parallel output generation across multiple instances of inputs of input data and prompts).

More particularly, the pre-trained machine-learned model can be frozen during the determination of one or more prompt parameters. The pre-trained machine-learned model can then be primed by the generated prompt for specific task performance.

Additionally or alternatively, one or more pre-trained machine-learned models 140 can be included in or otherwise stored and implemented by the server computing system 130 that communicates with the user computing device 102 according to a client-server relationship. For example, the pre-trained machine-learned models 140 can be implemented by the server computing system 140 as a portion of a web service (e.g., a prompt tuning service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned pre-trained machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss can be backpropagated through the model(s) to update one or more parameters of the model(s) (e.g., based on a gradient of the loss function).

Various loss functions can be used such as mean squared error, likelihood loss, cross entropy loss, hinge loss, a ranking loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the pre-trained machine-learned models 120 and/or 140 based on a set of training data 162. The training data 162 can include, for example, the pre-trained machine-learned model can be pre-trained on one or more large datasets. In some implementations, the training data 162 can include a plurality of training examples and a plurality of respective labels. Additionally and/or alternatively, the pre-training can include text masking, and the re-training can include sentinel training. The training data can include text data, image data, video data, audio data, and/or latent encoding data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
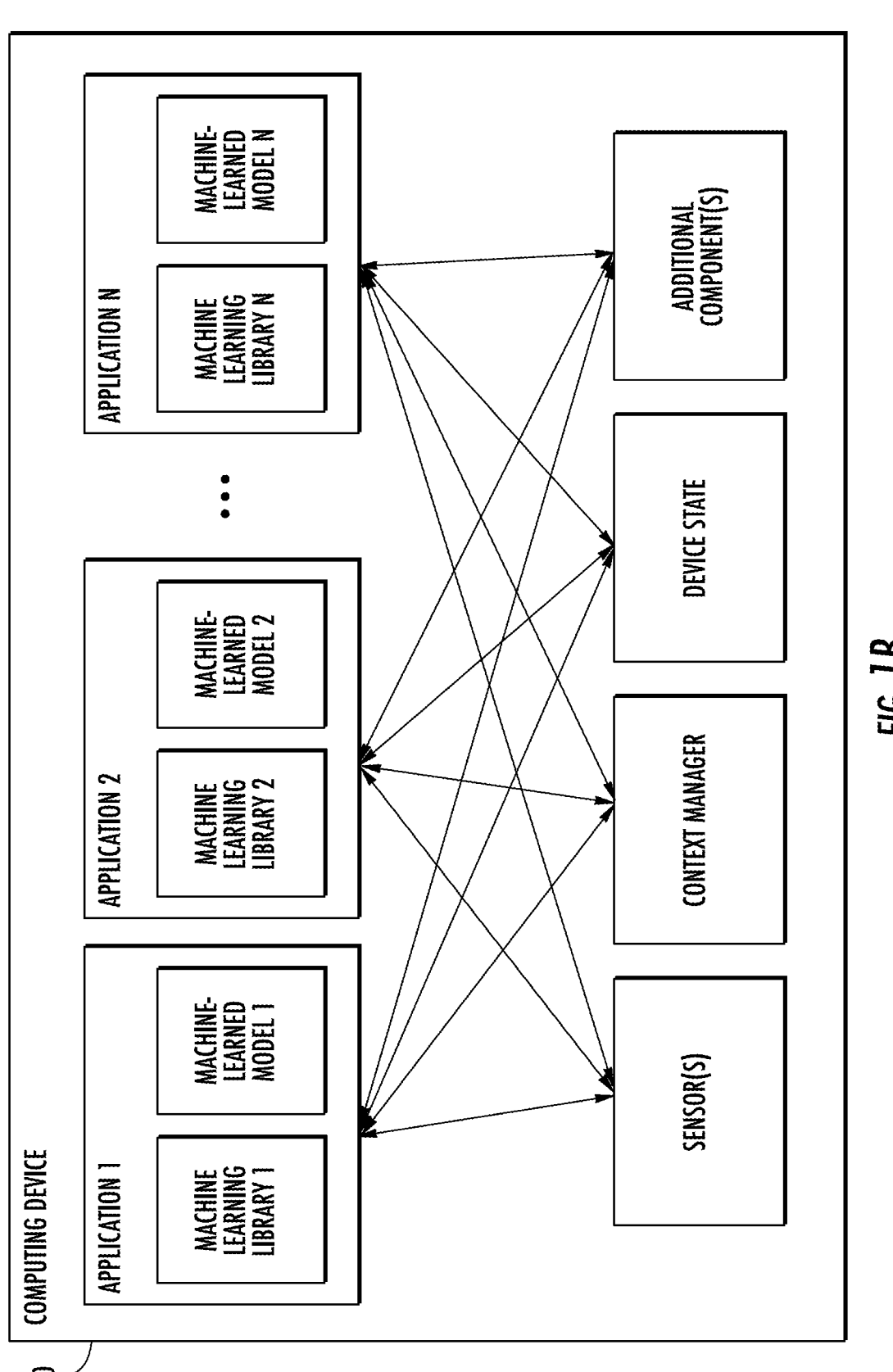
FIG. 1B depicts a block diagram of an example computing device that performs prompt transfer learning according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc. In some implementations, a plurality of applications can leverage a single pre-trained machine-learned model for a plurality of different tasks by generating and storing a prompt for each of the respective tasks associated with the plurality of different applications.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
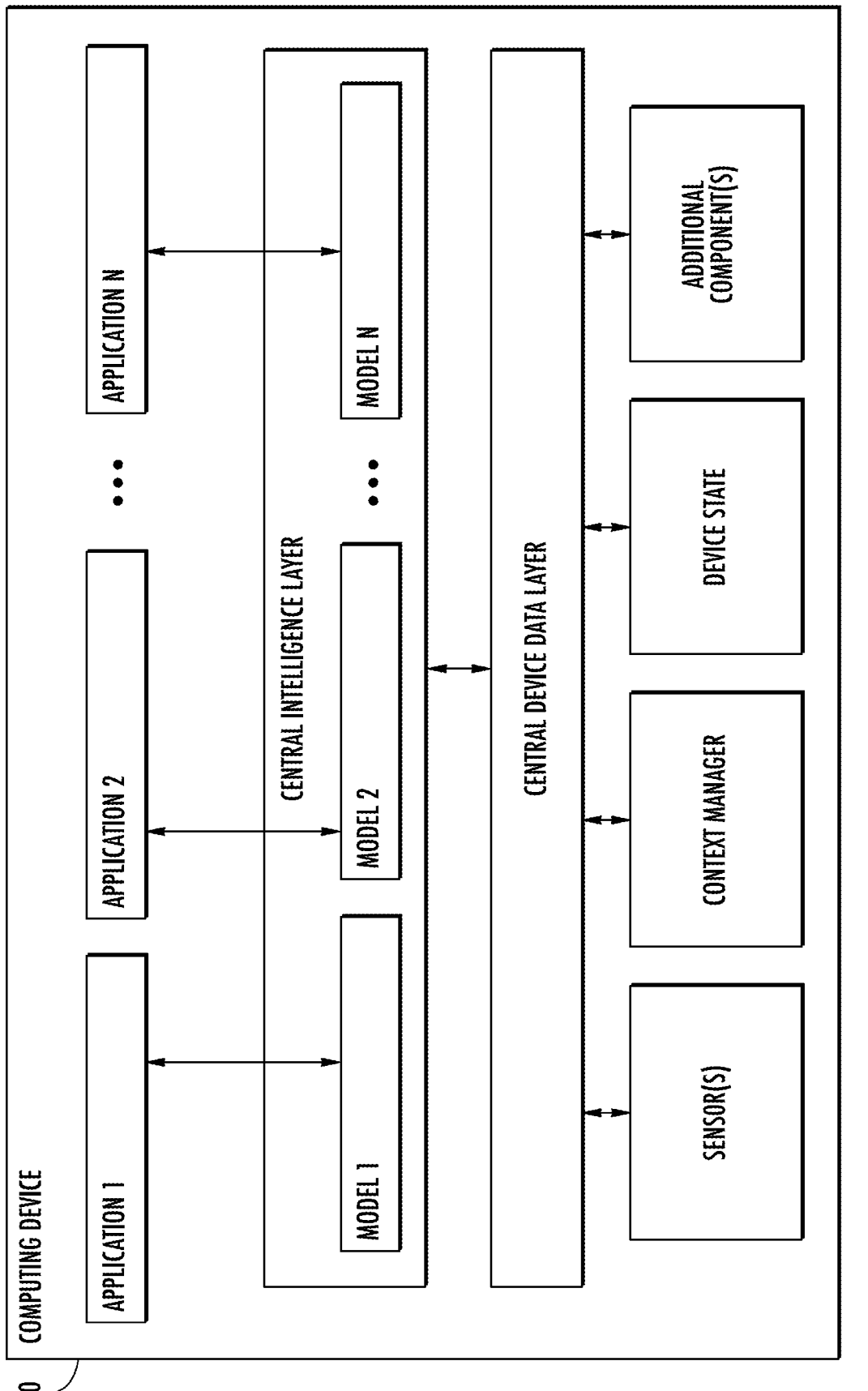
FIG. 1C depicts a block diagram of an example computing device that performs prompt transfer learning according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
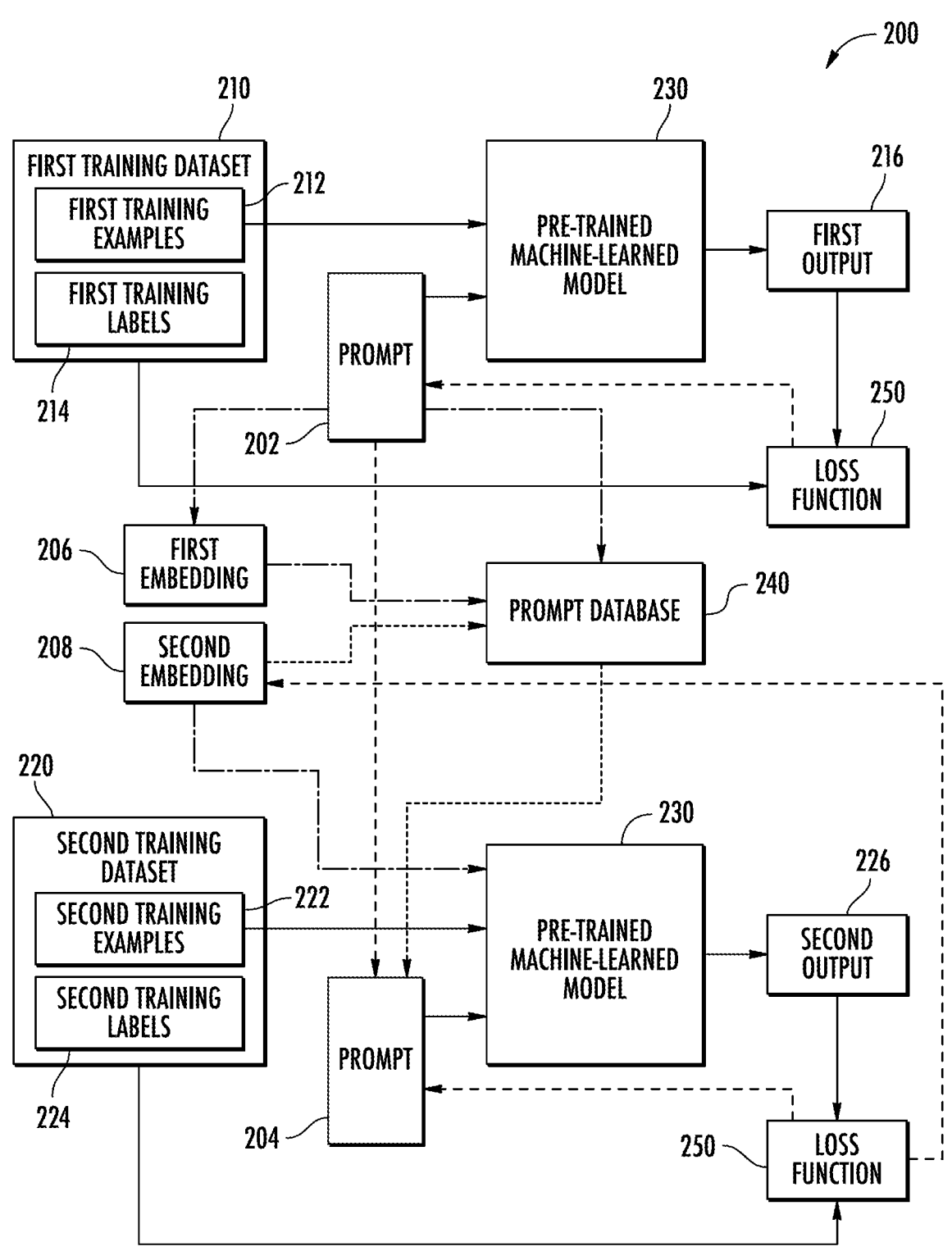
FIG. 2 depicts a block diagram of an example soft prompt transfer learning system according to example embodiments of the present disclosure.

FIG. 2 depicts a block diagram of an example soft prompt transfer learning system 200 according to example embodiments of the present disclosure. In some implementations, the soft prompt transfer learning system 200 is configured to receive a first training dataset 210 and a second training dataset 220 descriptive of a plurality of tasks and, as a result of receipt of the first training dataset 210 and the second training dataset 220, provide a first prompt 202 and a second prompt 204 that can be utilized for conditioning a pre-trained machine-learned model 230 for tasks associated with the respective training datasets. Thus, in some implementations, the soft prompt transfer learning system 200 can include a pre-trained machine-learned model 230 that is operable to process input data and a prompt and generate an output.

In particular, a first prompt 202 can be tuned and then later utilized to initialize the tuning of the second prompt 204. For example, a first training dataset 210 can be obtained. The first training dataset 210 can include a plurality of first training examples 212 and a plurality of first training labels 214. The first prompt 202 can be tuned based on the first training dataset 210. For example, a first training example of the plurality of first training examples 212 and an initial set of parameters (e.g., an initial prompt) can be processed with the pre-trained machine-learned model 230 to generate a first output 216. The first output 216 and a respective first training label (e.g., a first training label of the plurality of first training labels 214) associated with the first training example can be utilized to evaluate a loss function 250 to generate a prompt gradient. The prompt gradient can then be backpropagated to the set of parameters to adjust one or more parameters to tune the first prompt 202. The tuning loop can be repeated with the other first training examples and labels. During the tuning of the first prompt 202, a first embedding 206 can be generated by storing a partially trained first prompt 202. The fully trained first prompt 202 and the first embedding 206 can be stored in a prompt database 240.

The first training dataset 210 can be associated with a specific task (e.g., a classification task, a summarization task, a response task, an augmentation task, and/or a completion task) for training a prompt for the specific task. Alternatively and/or additionally, the first training dataset 210 can be associated with a plurality of different tasks for training a general prompt.

The pre-trained machine-learned model 230 can include a large frozen model. Additionally and/or alternatively, the pre-trained machine-learned model 230 can include a language model, an image processing model, an audio processing model, a video processing model, a latent encoding model, and/or a computer vision model.

A second training dataset 220 can be obtained. The second training dataset 220 can include a plurality of second training examples 222 and a plurality of second training labels 224. The second training dataset 220 can be associated with a task that differs from the tasks and/or task associated with the first prompt 202.

In some implementations, the second training dataset 220 can be utilized to generate a second embedding 208 which can be utilized to query the prompt database 240 for a prompt associated with a similar embedding to the second embedding 208. For example, a second training example of the plurality of second training examples 222 and a set of parameters (e.g., the initial prompt) can be processed with a pre-trained machine-learned model 230 to generate a second output 226. The second output 226 and a respective second training label (e.g., a second training label of the plurality of second training labels 224) associated with the second training example can be utilized to evaluate a loss function 250 to generate a prompt gradient. The prompt gradient can be backpropagated to adjust one or more parameters of the set of parameters (e.g., the initial prompt). The training loop can be repeated for a portion of the second training dataset 220 to generate the second embedding 208.

In some implementations, the first embedding 206 can be determined to be similar to the second embedding 208. The first prompt 202 can then be obtained from the prompt database 240 to initialize the training of the second prompt 204.

Training (or tuning) the second prompt 204 can include processing a second training example of the plurality of second training examples 222 and the first prompt 202 with the pre-trained machine-learned model to generate another second output 226. The generated second output 226 and a respective second training label can be utilized to evaluate the loss function 250 to generate a prompt gradient. The prompt gradient can then be backpropagated to adjust one or more parameters of the first prompt 202. The training loop can be repeated with the second training dataset 220 to generate the second prompt 204.

The second prompt 204 and the second embedding 208 can then be stored in the prompt database 240. The first prompt 202 and/or the second prompt 204 can then be utilized to condition the pre-trained machine-learned model 230 for particular tasks.

Figure 3:
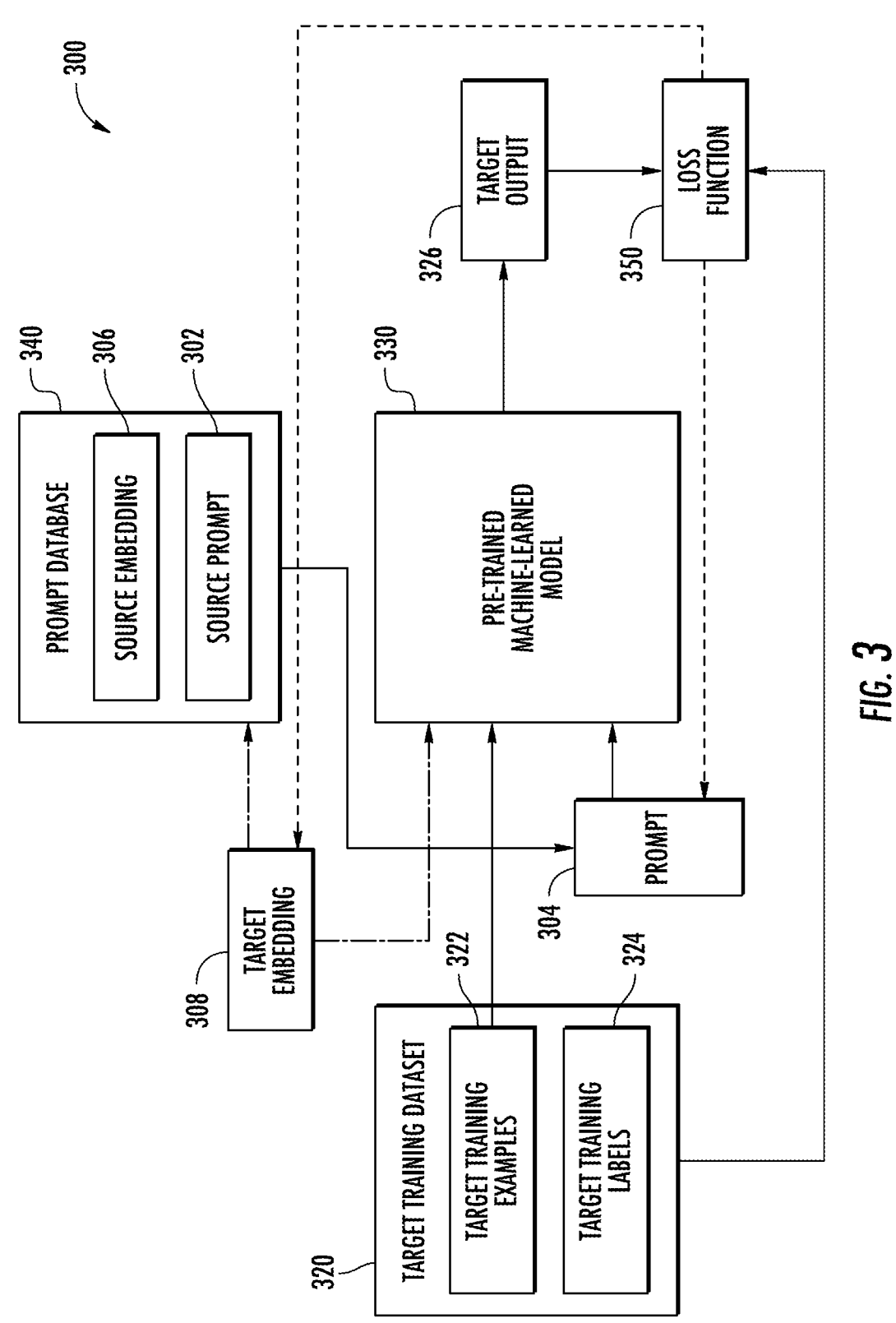
FIG. 3 depicts a block diagram of an example soft prompt transfer learning system according to example embodiments of the present disclosure.

FIG. 3 depicts a block diagram of an example soft prompt transfer learning system 300 according to example embodiments of the present disclosure. In particular, the soft prompt transfer learning system 300 can be configured to obtain and process target training dataset 320 to generate a target prompt 304.

In particular, a target training dataset 320 can be obtained. The target training dataset 320 can include a plurality of target training examples 322 and a plurality of target training labels 324. The target training dataset 320 can be associated with a task that differs from the tasks associated with source prompts of a prompt database 340. For example, the task associated with a source prompt 302 for initialization can differ from the target task associated with the target training dataset 320.

In some implementations, the target training dataset 320 can be utilized to generate a target embedding 308 which can be utilized to query the prompt database 340 for a prompt associated with a similar embedding to the target embedding 308. For example, a target training example of the plurality of target training examples 322 and a set of parameters (e.g., the initial prompt) can be processed with a pre-trained machine-learned model 330 to generate a target output 326. The target output 326 and a respective target training label (e.g., a target training label of the plurality of target training labels 324) associated with the target training example can be utilized to evaluate a loss function 350 to generate a prompt gradient. The prompt gradient can be backpropagated to adjust one or more parameters of the set of parameters (e.g., the initial prompt). The training loop can be repeated for a portion of the target training dataset 320 to generate the target embedding 308.

In some implementations, the source embedding 306 can be determined to be similar to the target embedding 308. The source prompt 302 can then be obtained from the prompt database 340 to initialize the training of the target prompt 304. For example, the source embedding 306 can be a task embedding in the prompt database 340 with the highest similarity score. Alternatively and/or additionally, a plurality of source embeddings from the prompt database 340 can be identified to be similar to the target embedding 308. A plurality of source prompts can be obtained based on the plurality of source embeddings being determined. The plurality of source prompts can be weighted to determine the initialization prompt for tuning the target prompt 304.

Training (or tuning) the target prompt 304 can include processing a target training example of the plurality of target training examples 322 and the source prompt 302 with the pre-trained machine-learned model 330 to generate another target output 326. The generated target output 326 and a respective target training label can be utilized to evaluate the loss function 350 to generate a prompt gradient. The prompt gradient can then be backpropagated to adjust one or more parameters of the source prompt 302. The training loop can be repeated with the target training dataset 320 to generate the target prompt 304.

The target prompt 304 and the target embedding 308 can then be stored in the prompt database 340. The source prompt 302 and/or the target prompt 304 can then be utilized to condition the pre-trained machine-learned model 330 for particular tasks.

The pre-trained machine-learned model 330 can include a large frozen model. Additionally and/or alternatively, the pre-trained machine-learned model 330 can include a language model, an image processing model, an audio processing model, a video processing model, a latent encoding model, and/or a computer vision model. Additionally and/or alternatively, the training examples can include text data, image data, audio data, and/or latent encoding data. The target task can be a classification task, a response task, a completion task, a summarization task, and/or an augmentation task. The similar embeddings can be determined based on a learned distribution of the embedding space and/or based on a similarity in values.

Figure 4:
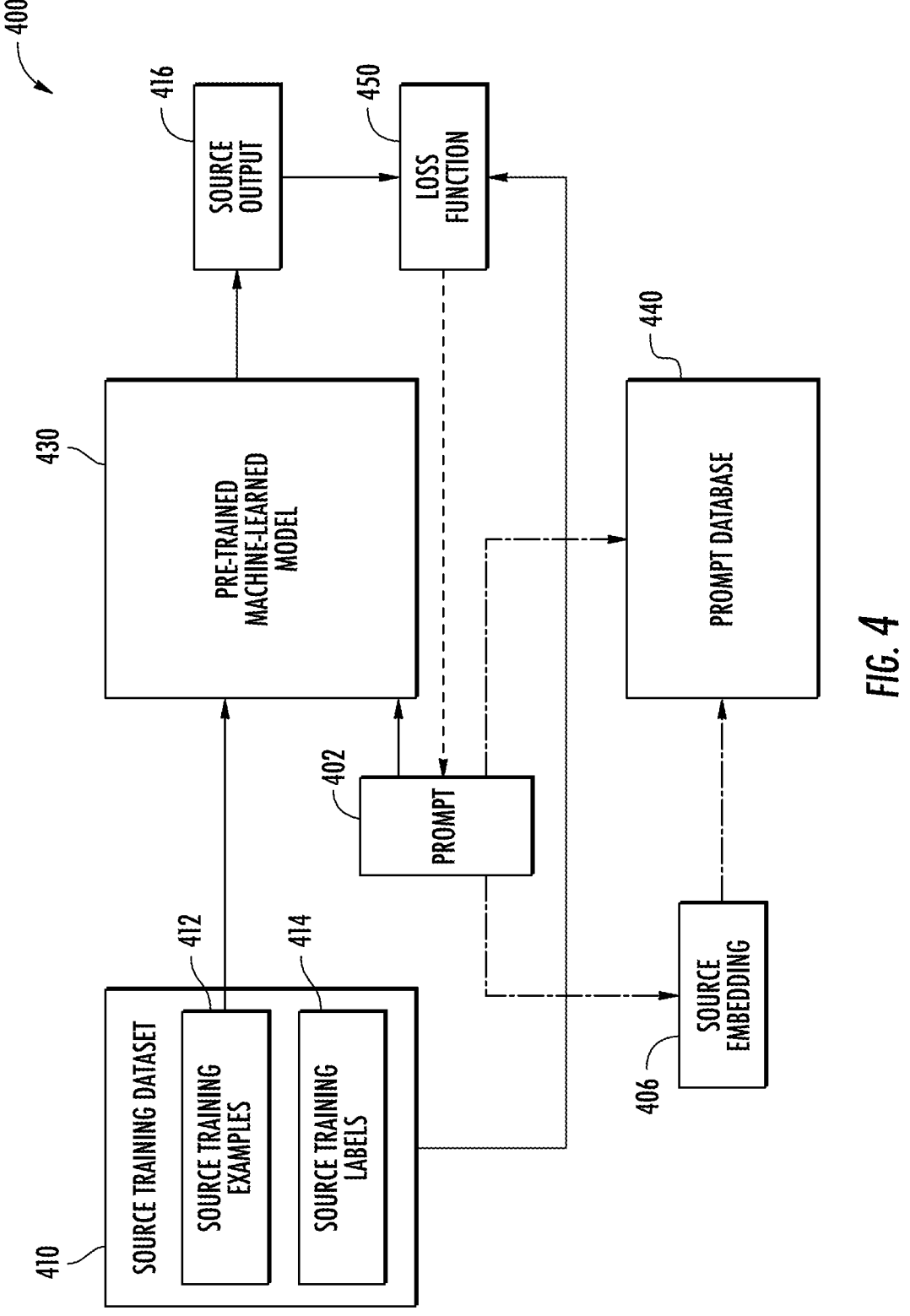
FIG. 4 depicts a block diagram of an example source prompt tuning system according to example embodiments of the present disclosure.

FIG. 4 depicts a block diagram of an example source prompt tuning system 400 according to example embodiments of the present disclosure. The source prompt tuning system 400 can be configured to obtain and process a source training dataset 410 to generate a source prompt 402 and source embedding 406.

In particular, a source prompt 402 can be tuned and then later utilized to initialize the tuning of a target prompt. For example, a source training dataset 410 can be obtained. The source training dataset 410 can include a plurality of source training examples 412 and a plurality of source training labels 414. The source prompt 402 can be tuned based on the source training dataset 410. For example, a source training example of the plurality of source training examples 412 and an initial set of parameters (e.g., an initial prompt) can be processed with the pre-trained machine-learned model 430 to generate a source output 416. The source output 416 and a respective source training label (e.g., a source training label of the plurality of source training labels 414) associated with the source training example can be utilized to evaluate a loss function 450 to generate a prompt gradient. The prompt gradient can then be backpropagated to the set of parameters to adjust one or more parameters to tune the source prompt 402. The tuning loop can be repeated with the other source training examples and labels. During the tuning of the source prompt 402, a source embedding 406 can be generated by storing a partially trained source prompt 402. The fully trained source prompt 402 and the source embedding 406 can be stored in a prompt database 440.

The source training dataset 410 can be associated with a specific task (e.g., a classification task, a summarization task, a response task, an augmentation task, and/or a completion task) for training a prompt for the specific task. Alternatively and/or additionally, the source training dataset 410 can be associated with a plurality of different tasks for training a general prompt.

The pre-trained machine-learned model 430 can include a large frozen model. Additionally and/or alternatively, the pre-trained machine-learned model 430 can include a language model, an image processing model, an audio processing model, a video processing model, a latent encoding model, and/or a computer vision model. Additionally and/or alternatively, the process can be repeated for a plurality of source training datasets associated with a plurality of different tasks to generate a plurality of source embeddings and a plurality of source prompts, which can be added to the prompt database 440. The plurality of different source prompts can be queried to find similar task embeddings associated with a new task which can then lead to the related source prompt being utilized for the initialization of the generation of a new prompt. Alternatively and/or additionally, the plurality of prompts in the prompt database 440 can be utilized for quick retrieval of pre-trained prompts for when a user requests a particular task to be completed by the pre-trained machine-learned model 430.

Figure 5:
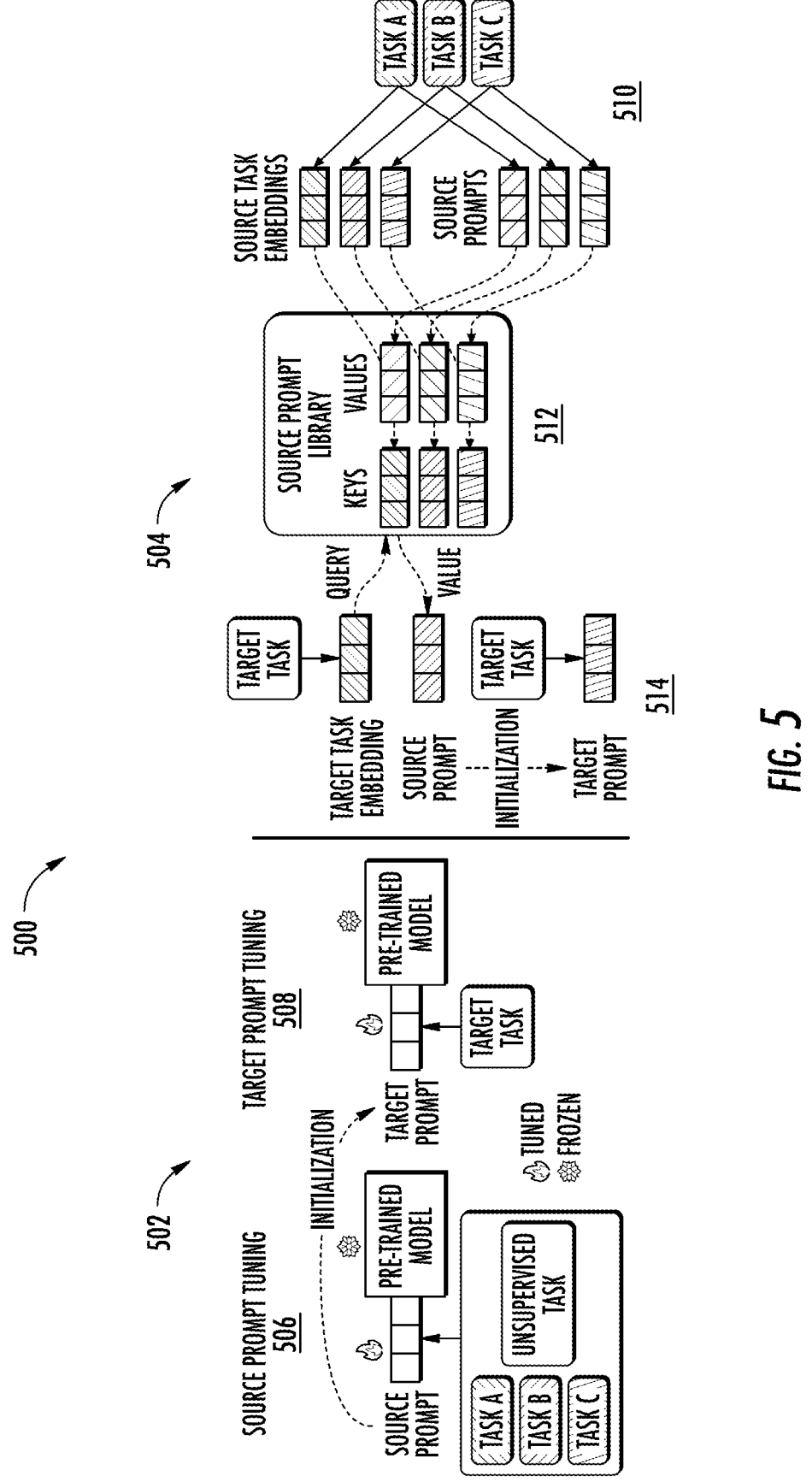
FIG. 5 depicts a block diagram of example prompt transfer learning systems according to example embodiments of the present disclosure.

FIG. 5 depicts a block diagram of example prompt transfer learning systems 500 according to example embodiments of the present disclosure. The prompt transfer learning systems 500 can include initializing new prompt tuning based on one or more general prompts 502 and/or initializing new prompt tuning based on one or more specific task prompts 504.

For the general prompt initialization system 502, source prompt tuning 506 can occur to generate a source prompt trained for a plurality of tasks. For example, the parameters of the source prompt can be learned based on a plurality of training datasets associated with a plurality of different tasks. The tasks can include classification tasks, completion tasks, response tasks, and/or augmentation tasks. In some implementations, the plurality of tasks can include one or more unsupervised tasks.

The generated source prompt can then be utilized for target prompt tuning 508. Target prompt tuning 508 can include tuning a target prompt for a target task. The tuning can be completed based on a target training dataset associated with the target task. The target prompt can be tuned by obtaining the general source prompt. The general source prompt can then be utilized as the initialization parameters for generating the target prompt.

For the specific task prompt initialization system 504, a plurality of source task embeddings and a plurality of source prompts can be learned for each of a plurality of task specific tasks 510. The plurality of source task embeddings and the plurality of source prompts can be generated by learning a set of parameters based on a plurality of training datasets associated with the plurality of task specific tasks 510. In some implementations, the plurality of source task embeddings can be descriptive of parameters of partially learned prompts. The plurality of source task embeddings can be paired with their respective source prompts and can be stored in a source prompt library 512 (e.g., a prompt database).

A target task can then be obtained. A target task embedding can then be generated by processing a target training dataset associated with the target task. The generation can include processing a portion of the target training dataset and a set of parameters with a pre-trained machine-learned model to generate an output, which can then be evaluated to adjust one or more parameters of the set of parameters. The target task embedding can then be utilized to query the source prompt library 512. A similarity score can be generated for each of the source task embeddings. A source task embedding with the greatest similarity to the target task embedding can be determined. The source prompt associated with that specific source task embedding can be obtained. The source prompt can then be utilized as an initialization point for generating the target prompt. The target training dataset can be utilized to train the parameters of the source prompt to then generate the target prompt 514 associated with the target task. In some implementations, a plurality of source task embeddings with the greatest similarity to one or more target task embeddings can be determined. The plurality of determined source task embeddings can be utilized to determine a source prompt to utilize for initializing the training of the target prompt.

Figure 9:
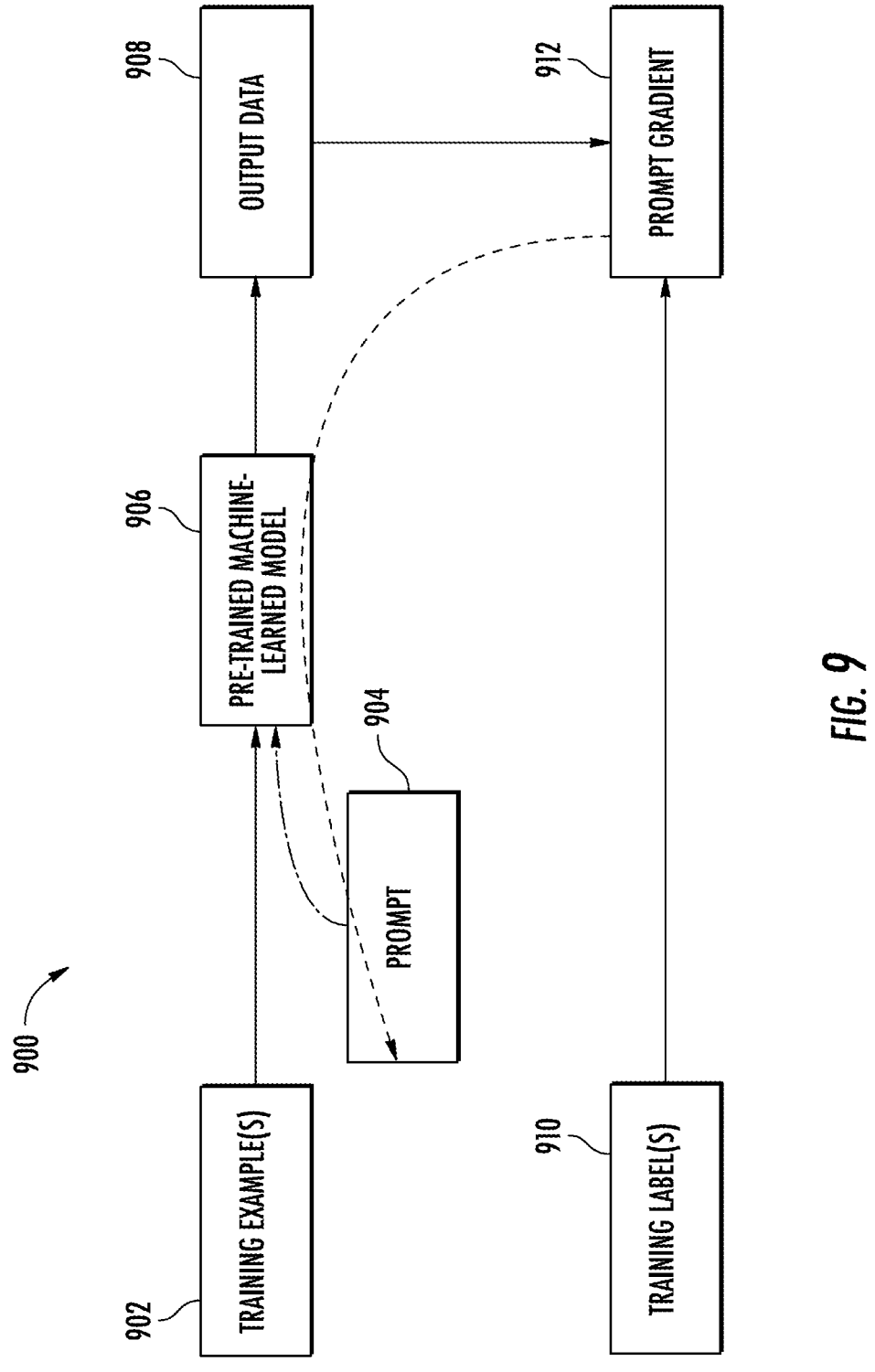
FIG. 9 depicts a block diagram of an example prompt tuning system according to example embodiments of the present disclosure.

FIG. 9 depicts a block diagram of an example prompt generation system 900 according to example embodiments of the present disclosure. In some implementations, the prompt generation system 900 is configured to receive a set of one or more training examples 902 descriptive of example input data and, as a result of receipt of the one or more training examples 902, provide output data 908 that can be descriptive of a predicted output (e.g., a predicted classification, predicted additional text, predicted augmentation, predicted segmentation, etc.). Thus, in some implementations, the prompt generation system 900 can include a pre-trained machine-learned model 906 that is operable to process input data and generate the output data 908.

In particular, FIG. 9 can depict a prompt generation system 900 being utilized to tune a prompt 904 for a particular task associated with the one or more training examples 902 and the one or more respective training labels 910. For example, one or more training examples 902 may be processed by the pre-trained machine-learned model 906 to generate output data 908. The output data 908 can be compared to one or more training labels 910 associated with the one or more training examples 910 in order to determine a prompt gradient 912. The prompt gradient 912 can then be utilized to adjust one or more parameters of a prompt 904. In some implementations, the prompt 904 can be input with the one or more training examples 902 to prime the pre-trained machine-learned model 906 for a particular task. The resulting output data 908 can then be utilized to evaluate a loss function to generate a prompt gradient 912 that can be utilized to further tune the prompt 904. The prompt parameter training can involve a plurality of iterations of output generation and comparison. During such training, the parameters of the pre-trained machine-learned model 906 can remain unadjusted, or "frozen."

Example Methods

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain target task data. The target task data can be associated with a target task for a machine-learned model. In some implementations, the target task data can include one or more target training examples and one or more target training labels. The one or more target training examples and the one or more target training labels can be associated with the target task of the target task data. In some implementations, the target task data can include a plurality of target training examples and a plurality of target training labels selected as descriptive of the particular target task.

At 604, the computing system can process the target task data to generate a target task embedding. Processing the target task data to generate the target task embedding can include learning one or more embedding parameters based at least in part on the target task data. In some implementations, generating the target task embedding can include processing a target training example and an initial prompt with a pre-trained machine-learned model to generate a target training output. The target training output and the respective target training label for the target training example can be compared to evaluate a loss function to output a prompt gradient. The prompt gradient can be utilized to adjust one or more parameters of the initial prompt. The training can be repeated for a set number of training loops in order to generate the target task embedding.

At 606, the computing system can obtain a source prompt from a prompt database based on the target task embedding. The source prompt can be associated with a previously-learned task. In some implementations, the source prompt can be associated with a source embedding. The source prompt may have been pre-trained on a plurality of different training datasets associated with a plurality of different tasks. In some implementations, obtaining the source prompt from the prompt database based on the target task embedding can include determining a particular source task embedding associated with the target task embedding based on a learned distribution associated with an embedding space.

Alternatively and/or additionally, obtaining the source prompt from the prompt database based on the target task embedding can include determining the target task embedding(s) is(are) associated with the source embedding(s) and obtaining the source prompt associated with the source embedding(s). The determination can be based on a learned distribution of an embedding space associated with the target task embedding and the source embedding. Alternatively and/or additionally, the determination can be based on a nearest neighbor determination.

At 608, the computing system can process the source prompt and the target task data with a pre-trained machine-learned model to generate one or more outputs. In some implementations, the source prompt can be utilized to condition the target task data before processing with the pre-trained machine-learned model. Alternatively and/or additionally, a target training example and the source prompt can be processed with a pre-trained machine-learned model to generate an output. The processing can occur for a plurality of target training examples of the target training examples of the target training data to generate a plurality of outputs.

At 610, the computing system can generate a target prompt for the target task based on the source prompt and the one or more outputs. Generating the target prompt can involve adjusting one or more parameters of the source prompt based on the one or more outputs. For example, the output from processing the target training example can be compared against the respective target training label in order to evaluate a loss function and output a prompt gradient that can be utilized to adjust the one or more parameters of the source prompt. The process can be repeated iteratively for each output of the plurality of outputs generated by processing the plurality of target training examples.

In some implementations, generating the target prompt can include evaluating a loss function based on the one or more outputs and adjusting one or more parameters of the source prompt based on the loss function.

Additionally and/or alternatively, the computing system can include obtaining input data and processing the input data and the target prompt with the pre-trained machine-learned model to generate a target task output. The target task output can be associated with the target task.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a first task dataset. The first task dataset can be associated with a first task. In some implementations, the first task can be descriptive of a text completion task. Alternatively and/or additionally, the first task may be descriptive of a question-answer task (e.g., a question may be received and a response may be generated as output), an augmentation task, and/or a classification task (e.g., semantics classification, sentiment classification, and/or prose classification (e.g., poetry versus prose and/or young adult prose, Victorian era prose, romance prose, science fiction prose, etc.). The first task dataset can include a plurality of first training examples and a plurality of respective first training examples.

At 704, the computing system can process the first task dataset to generate a first source task embedding and train a first source prompt based on the first task dataset. Generating the first source task embedding can include partially training a set of parameters based on the first task dataset. In some implementations, a training example of the first task dataset and an initial prompt can be processed with a pre-trained machine-learned model to generate a first task output. The first task output can be compared against a respective training label of the first task dataset to evaluate a loss function and generate a prompt gradient. The prompt gradient can be utilized to adjust one or more parameters of the initial prompt. The process can be repeated for a plurality of first training examples in order to generate the first source task embedding.

Training the first source prompt can include processing the first task dataset and a set of parameters with a pre-trained machine-learned model to generate a first task output. The pre-trained machine-learned model can include a large frozen model. In some implementations, a plurality of pre-trained parameters for the pre-trained machine-learned model can be fixed during prompt tuning. Additionally and/or alternatively, training the first source prompt can include adjusting one or more parameters of the set of parameters based on the first task output. Training the first source prompt can include further adjusting the set of parameters of the first source task embedding. For example, a training example of the first task dataset and the first source task embedding can be processed with the pre-trained machine-learned model to generate a first task output. The first task output can be compared against a respective training label of the first task dataset to evaluate a loss function and generate a prompt gradient. The prompt gradient can then be backpropagated in order to adjust one or more parameters of the first source task embedding. The process can be completed for a plurality of training examples in order to generate the first source prompt.

At 706, the computing system can obtain a target task dataset and process the target task dataset to generate a target task embedding. The target task dataset can be associated with a target task. In some implementations, the target task can be descriptive of a sentiment classification task. Alternatively and/or additionally, the target task can be descriptive of a text completion task, a question-answer task (e.g., a question may be received and a response may be generated as output), an augmentation task, and/or a classification task (e.g., semantics classification, sentiment classification, and/or prose classification (e.g., poetry versus prose and/or young adult prose, Victorian era prose, romance prose, science fiction prose, etc.). In some implementations, the target task dataset can include a plurality of target training examples and a plurality of respective target training labels.

Generating the target task embedding can include partially training a set of parameters based on the target task dataset. In some implementations, a training example of the target task dataset and an initial prompt can be processed with a pre-trained machine-learned model to generate a training target task output. The training target task output can be compared against a respective training label of the target task dataset to evaluate a loss function and generate a prompt gradient. The prompt gradient can be utilized to adjust one or more parameters of the initial prompt. The process can be repeated for a plurality of target training examples in order to generate the target task embedding.

At 708, the computing system can determine the target task embedding is associated with the first source task embedding. Determining the target task embedding is associated with the first source task embedding can include generating a similarity score based on a similarity between the target task embedding(s) and the first source task embedding(s). The similarity score can then be utilized to determine whether a respective source prompt of the first source task embedding(s) will be used for initializing the training of a target task prompt.

At 710, the computing system can process the target task dataset and the first source prompt with the pre-trained machine-learned model to generate a target task output. For example, a target training example of the target task dataset and the first source prompt can be processed with the pre-trained machine-learned model to generate the target task output.

At 712, the computing system can adjust one or more parameters of the first source prompt based on the target task output to generate a target task prompt. For example, the target task output can be compared to a target training label of the target task dataset in order to evaluate a loss function and generate a prompt gradient. The prompt gradient can be backpropagated and utilized to adjust one or more parameters of the first source prompt. The training loop can be repeated for a plurality of training examples of the target task dataset in order to generate a plurality of prompt gradients, which can be utilized to adjust the parameters of the first source prompt and generate the target task prompt.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain target task data. The target task data can be associated with a target task for a machine-learned model. In some implementations, the target task can include an image classification task, a sentiment classification task, a semantics classification task, a text completion task, a question-answer task, an augmentation task, and/or summarization task.

At 804, the computing system can obtain a source prompt from a prompt database based on the target task data. The source prompt can include one or more learned parameters representative of a source task. In some implementations, the source prompt can be associated with a source embedding. Additionally and/or alternatively, a target task embedding can be generated by processing one or more training examples of the target task dataset and an initial set of parameters with a pre-trained machine-learned model to generate one or more initial outputs, which can be utilized to adjust one or more parameters of the initial set of parameters to generate the target task embedding. A similar generation loop can be completed for one or more training examples of a source task dataset in order to generate source embedding. The source prompt may be obtained in response to a similarity between the target task embedding and the source embedding (e.g., one or more source embeddings can be determined to be similar to the one or more target task embeddings (e.g., the per token similarity matching/scoring method for similarity determination)).

In some implementations, obtaining the source prompt from the prompt database based on the target task data can include processing the target task data with an embedding model to generate a target task embedding, determining a nearest embedding neighbor for the target task embedding based on a plurality of embeddings stored in the prompt database, and determining the source prompt is associated with the nearest embedding neighbor. The source embedding and the source prompt may have been generated by training a plurality of source parameters based on a source task dataset associated with the source task.

At 806, the computing system can process the source prompt and the target task data with a pre-trained machine-learned model to generate one or more outputs. The pre-trained machine-learned model can include a frozen language model (e.g., the parameters of the language model may be fixed as the parameters of the source prompt and/or the target prompt are being learned).

At 808, the computing system can evaluate a loss function based on the one or more outputs. The loss function can be a ground truth loss function that determines the differences between the one or more outputs and one or more ground truth labels.

At 810, the computing system can adjust one or more parameters of the source prompt based on the loss function to generate a target prompt. The target prompt and a target task embedding may be stored in the prompt database to utilize the target prompt for the initialization of training for new prompts associated with new tasks.

Example Implementations, Uses, and Experiments

The systems and methods can learn task-specific soft prompts to condition a frozen pre-trained model to perform different tasks. In some implementations, the systems and methods can include a prompt-based transfer learning approach, which can be denoted as SPOT: Soft Prompt Transfer. SPOT can first learn a prompt on one or more source tasks and can then leverage the learned prompt to initialize the prompt generation for a target task. The systems and methods can significantly boost the performance of prompt tuning across many tasks. In some implementations, across all model sizes, the systems and methods may match or outperform standard model tuning (which finetunes all model parameters) on the SUPERGLUE benchmark, while using up to 27,000× fewer task-specific parameters. Additionally and/or alternatively, the systems and methods can include an efficient retrieval approach that interprets task prompts as task embeddings to identify similar tasks and predict the most transferable source tasks for a novel target task.

Larger pre-trained language models can provide increasingly improved performance; however, the training and retraining of the large pre-trained language models can be computationally expensive. The large models can present a challenge for their practical application. For 100 B+ parameter models, fine-tuning and deploying a separate instance of the model for each downstream task can be prohibitively expensive. Therefore, the systems and methods disclosed herein can include techniques that train a small set of parameters called a prompt. The learned soft prompts can be processed as additional learnable parameters injected into the language model. The systems and methods can learn a small task-specific prompt (e.g., a sequence of tunable tokens prepended to each example) for each downstream task during adaptation to condition the frozen language model to perform the task. As model capacity increases, prompt tuning can become competitive with model tuning, which finetunes the entire model on each downstream task. Nevertheless, at smaller model sizes (below 11 B parameters), there can be large gaps between prompt tuning and model tuning.

The systems and methods disclosed herein can include a transfer learning approach in the context of prompt tuning. The transfer learning approach can include first training a prompt on one or more source tasks, and then using the resulting prompt to initialize the prompt for a target (downstream) task. Experiments can show that SPOT can provide significant improvements over standalone prompt tuning and prompt design across tasks and model sizes. For instance, on the SUPERGLUE benchmark (Wang et al., "Superglue: A stickier benchmark for general-purpose language understanding systems," *In Proceedings of the 33rd International Conference on Neural Information Processing Systems* (NeurIPS 2019).), the systems and methods can obtain +10.1 and +2.4 point average accuracy improvements using the T5 BASE (220M parameter) and T5 XXL (11B parameter) models (Raffel et al., "Exploring the limits of transfer learning with a unified text-to-text transformer," *Journal of Machine Learning Research* (JMLR 2020).), respectively. In addition, SPOT can be competitive with or can outperform model tuning across all model sizes.

The systems and methods can determine which source prompts can be utilized for the initialization of target prompt training. For example, the systems and methods can conduct a systematic study of the T5 model using 26 NLP tasks in 160 combinations of source and target tasks. The results can indicate that many tasks can benefit each other via prompt transfer. Additionally and/or alternatively, the systems and methods can interpret the learned task prompts as task embeddings to construct a semantic space of tasks and can formalize the similarity between tasks. The systems and methods can design an efficient retrieval algorithm that measures task embedding similarity, allowing practitioners to identify source tasks that can yield positive transfer.

In some implementations, the systems and methods can include an efficient retrieval method that interprets task prompts as task embeddings to construct a semantic space of tasks, and measures task embedding similarity to identify which tasks could benefit each other. The library of task prompts and pre-trained models can be provided with practical recommendations for adapting the library to NLP practitioners at https://github.com/google-research/prompt-tuning/tree/main/prompt_tuning/spot.

To improve performance of prompt tuning on a target task, the systems and methods can include source prompt tuning, an intermediate training stage between language model pre-training and target prompt tuning (e.g., FIG. 5, left), to learn a prompt on one or more source tasks (while still keeping the base model frozen), which can then be used to initialize the prompt for the target task. The approach can retain all the computational benefits of prompt tuning: for each target task, prompt tuning may store a small task-specific prompt, enabling the reuse of a single frozen pre-trained model across all tasks.

For experimentation, the frozen models can be built on top of the pre-trained T5 checkpoints of all sizes: SMALL, BASE, LARGE, XL, XXL with 60M, 220M, 770M, 3 B, and 11 B parameters, respectively. In the experiments with SPOT, the experiments can leverage the LM adapted version of T5, which can be found to be easier to optimize for prompt tuning (Lester et al., "The power of scale for parameter-efficient prompt tuning," *In Proceedings of the* 2021 *Conference on Empirical Methods in Natural Language Processing* (EMNLP 2021).).

The experiments can compare SPOT to prompt tuning (e.g., the training of a set of parameters to condition an input) and model tuning (e.g., the training and/or retraining of a large model on each target task).

The experiments can study the downstream performance on a diverse set of tasks from the GLUE and SUPERGLUE benchmarks. The systems and methods can train for a fixed number of steps and report results on the validation set associated with each dataset.

As with language model pre-training, the choice of training data can be useful for successful prompt transfer. To investigate the impact of source training data on downstream performance, the experiments can compare a diverse set of source tasks.

For a single unsupervised learning task, the experiments can first consider training the prompt on a fraction of the C4 (Colossal Clean Crawled Corpus) dataset (Raffel et al., "Exploring the limits of transfer learning with a unified text-to-text transformer," *Journal of Machine Learning Research* (JMLR 2020).) using the "prefix LM" objective. Although the task may be used to pre-train our frozen T5 models already, the task may still be helpful for learning a general-purpose prompt.

For a single supervised learning task, the experiments can train the prompt using a supervised task. The experiments can use either MNLI (Williams et al., "A broad-coverage challenge corpus for sentence understanding through inference," *In Proceedings of the Conference of the North American Chapter of the Association for Computational Linguistics: Human Language Technologies* (NAACL 2018).) or SQUAD (Rajpurkar et al., "SQuAD: 100,000+ questions for machine comprehension of text.," *In Proceedings of the Conference on Empirical Methods in Natural Language Processing* (EMNLP 2016).) as a single source task. MNLI can be shown to be helpful for many sentence-level classification tasks, while SQUAD may be found to generalize well to QA tasks.

For a multi-task mixture, the experiments can consider using a single source task or a plurality of source tasks. An alternative approach can be multi-task training. Within T5's unified text-to-text framework, the training can include mixing different datasets together. The experiments can explore mixing datasets from different NLP benchmarks or families of tasks, including GLUE, SUPERGLUE, natural language inference (NLI), paraphrasing/semantic similarity, sentiment analysis, question answering (QA) on MRQA (Fisch et al., "MRQA 2019 shared task: Evaluating generalization in reading comprehension," *In Proceedings of the 2nd Workshop on Machine Reading for Question Answering* (MRQA 2019).), commonsense reasoning on RAINBOW (Lourie et al., "Unicorn on rainbow: A universal commonsense reasoning model on a new multitask benchmark," *Proceedings of the AAAI Conference on Artificial Intelligence* (AAAI 2021).). The experiments can create a mixture of source tasks from each of the NLP benchmarks/families of tasks above, and a mixture comprising all datasets (C4+55 labeled datasets), using an examples-proportional mixing strategy with an artificial dataset size limit K=219 examples.

For experimentations, the only new parameters can be introduced during both source and target prompt tuning. In some implementations, the prompt can be a shared prompt $\rho \in \mathbb{R}^{\mathcal{L} \times \mathcal{E}}$ prepended to each (embedded) input sequence, where $\mathcal{L}$, $\mathcal{E}$, are the prompt length and the embedding size, respectively. In some implementations, the systems and methods can set $\mathcal{L}$ L=100 tokens and can tune the prompt for a fixed number of steps $\mathcal{S}$. While $\mathcal{S}$ may be set to 30K, the systems and methods can find that additional tuning is helpful on large datasets. In some implementations, the systems and methods can set $\mathcal{S}$ to $2^{18}$=262,144, with the exception of ablation experiments (rows "longer tuning") in Table 1 which can use $\mathcal{S}$=30K. For source prompt tuning, the prompt token embeddings can be initialized from sampled vocabulary (i.e., the 5,000 most common tokens). During target prompt tuning, the systems and methods can save a checkpoint every 500 steps and can report results on the checkpoint with the highest validation performance.

Additionally and/or alternatively, the experiments can be utilized to compare the results of SPOT and other approaches as shown in Table 1.

| Method | GLUE | SUPERGLUE |
|---|---|---|
| BASELINE | | |
| PROMPTTUNING | $81.2_{0.4}$ | $66.6_{0.2}$ |
| longer tuning | $78.4_{1.7}$ | $63.1_{1.1}$ |
| SPoT with different source mixtures | | |
| GLUE (8 tasks) | $82.8_{0.2}$ | $73.2_{0.3}$ |
| longer tuning | $82.0_{0.2}$ | $70.7_{0.4}$ |
| C4 | $82.0_{0.2}$ | $67.7_{0.3}$ |
| MNLI | $82.5_{0.0}$ | $72.6_{0.8}$ |
| SQUAD | $82.2_{0.1}$ | $72.0_{0.4}$ |
| SUPERGLUE (8 tasks) | $82.0_{0.1}$ | $66.6_{0.2}$ |
| NLI (7 tasks) | $82.6_{0.1}$ | $71.4_{0.2}$ |
| Paraphrasing/similarity (4 tasks) | $82.2_{0.1}$ | $69.7_{0.5}$ |
| Sentiment (5 tasks) | $81.1_{0.2}$ | $68.6_{0.1}$ |
| MRQA (6 tasks) | $81.8_{0.2}$ | $68.4_{0.2}$ |
| RAINBOW (6 tasks) | $80.3_{0.6}$ | $64.0_{0.4}$ |
| Translation (3 tasks) | $82.4_{0.2}$ | $65.3_{0.1}$ |
| Summarization (9 tasks) | $80.9_{0.3}$ | $67.1_{1.0}$ |
| GEM (8 tasks) | $81.9_{0.2}$ | $70.5_{0.5}$ |
| All (C4 + 55 supervised tasks) | $81.8_{0.2}$ | $67.9_{0.9}$ |

Table 1 can depict GLUE and SUPERGLUE results achieved by applying T5 BASE with different prompt tuning approaches. The results can include the mean and standard deviation (in the subscript) across three random seeds. SPOT may significantly improve performance and stability of prompt tuning across the two benchmarks.

SPOT can improve performance and stability of prompt tuning. The results on the GLUE and SUPERGLUE benchmarks with T5 BASE (Table 1) can suggest that prompt transfer provides an effective means of improving performance for prompt tuning. For example, the best-performing variant of SPOT can outperform the vanilla prompt tuning approach on both GLUE and SUPERGLUE by a substantial margin, obtaining +4.4 and +10.1 point average accuracy improvements, respectively. The experimental results can indicate that longer tuning can also be an important ingredient for achieving the best performance and can be complementary to prompt transfer. Additionally, when longer tuning is omitted, the experiments can show that SPOT improves stability across runs.

Within SPOT, the results can be compared to analyze the effectiveness of different source mixtures (see Table 1). For example, source prompt tuning on GLUE can perform best on both GLUE and SUPERGLUE, obtaining average scores of 82.8 and 73.2, respectively.

In some implementations, soft prompt transfer can significantly boost the performance of prompt tuning. The systems and methods can first measure transferability across all task combinations, can show that by interpreting task prompts as task embeddings, can construct a semantic space of tasks in which similar tasks cluster together, and can include a retrieval algorithm that leverages task embedding similarity to choose which source tasks to use for a given novel target task (e.g., FIG. 5, right). The approach can eliminate 69% of the source task search space while keeping 90% of the best-case quality gain.

For measuring transferability, the experiments can study a diverse set of 16 source datasets and 10 target datasets (see Table 2). The experiments can consider all 160 possible source-target pairs and can perform transfer from each source task to each target task. The source tasks may be data-rich and/or may have been shown to yield positive transfer in prior work. To simulate a realistic scenario, the experiments can use low-resource tasks (less than 10K training examples) as target tasks.

| Name | Task type | Train |
|---|---|---|
| 16 source tasks | | |
| C4 | language modeling | 365M |
| DOCNLI | NLI | 942K |
| YELP-2 | sentiment analysis | 560K |
| MNLI | NLI | 393K |
| QQP | paraphrase detection | 364K |
| QNLI | NLI | 105K |
| RECORD | QA | 101K |
| CXC | semantic similarity | 88K |
| SQUAD | QA | 88K |
| DROP | QA | 77K |
| SST-2 | sentiment analysis | 67K |
| WINOGRANDE | commonsense reasoning | 40K |
| HELLASWAG | commonsense reasoning | 40K |
| MULTIRC | QA | 27K |
| COSMOSQA | commonsense reasoning | 25K |
| RACE | QA | 25K |
| 10 target tasks | | |
| BOOLQ | QA | 9K |
| COLA | grammatical acceptability | 9K |
| STS-B | semantic similarity | 6K |
| WIC | word sense disambiguation | 5K |
| CR | sentiment analysis | 4K |
| MRPC | paraphrase detection | 4K |
| RTE | NLI | 2K |
| WSC | coreference resolution | 554 |
| COPA | QA | 400 |
| CB | NLI | 250 |

Table 2 can depict tasks used in the task transferability experiments, sorted by training dataset size.

To limit computational costs, the systems and methods can use T5 BASE in the task transferability experiments. The systems and methods can include performing 262,144 prompt tuning steps on each source task. The prompt checkpoint with the highest source task validation performance can be selected to initialize prompts for target tasks. Since the target datasets may be small, the systems and methods may only perform 100K prompt tuning steps on each target task. The systems and methods can repeat each experiment three times with different random seeds.

The systems and methods can leverage tasks benefiting each other via prompt transfer. In some implementations, prompt transfer can provide a significant gain on the target task. The transfer MNLI→CB can yield the largest relative error reduction of 58.9% (from an average score of 92.7 to 97.0), followed by MNLI COPA (29.1%) and RECORD→WSC (20.0%). Using the best source prompt (out of 48) for each target task can dramatically improve the average score across our 10 target tasks from 74.7 to 80.7. The results can show effective transfer from large source tasks that involve high-level reasoning about semantic relationships among sentences (e.g., MNLI), or when the source and target tasks can be similar (e.g., CXC STS-B). Positive transfer can occur between relatively dissimilar tasks (e.g., RECORD→WSC, SQUAD→MRPC, CXC→WIC).

For defining task similarity through prompts, the prompt parameters may be updated during prompt tuning on specific tasks (e.g., the learned prompts can encode task-specific knowledge). In particular, the prompt parameters can be used to reason about the nature of tasks and their relationships. For example, the systems and methods can interpret task prompts as task embeddings and can construct a semantic space of tasks. In some implementations, the systems and methods can define a task's embedding as the prompt checkpoint after training for 10K steps on that task. Additionally and/or alternatively, using early checkpoints can allow for quick computation of task embeddings for novel target tasks. The systems and methods can estimate the similarity between two tasks $t_1$, $t_2$ by measuring the similarity between their corresponding task embeddings $e_1$, $e_2$, using the cosine similarity of average tokens and/or per-token average cosine similarity.

Cosine similarity of average tokens can involve computing the cosine similarity between the average pooled representations of the prompt tokens:

$$sim(t_1, t_2) = \cos\left(\frac{1}{\mathcal{L}}\sum_i e_{1;i}, \frac{1}{\mathcal{L}}\sum_j e_{2;j}\right),$$

where $e_{1;i}$, $e_{2;j}$ can denote the respective prompt tokens of $e_1$, $e_2$, and cos can denote the cosine similarity.

Per-token average cosine similarity can involve computing the average cosine similarity between every prompt token pair $(e_1, e_2)$:

$$sim(t_1, t_2) = \frac{1}{\mathcal{L}^2}\sum_i \sum_j \cos(e_{1;i}, e_{2;j}).$$

Additionally and/or alternatively, the systems and methods can leverage task embeddings to capture task relationships. The systems and methods can observe that the learned task embeddings capture many intuitive task relationships. Specifically, similar tasks may group together into clusters, including QA (SQUAD, RECORD, and DROP; MULTIRC and BOOLQ), sentiment analysis (YELP-2, SST-2, and CR), NLI (MNLI and CB; DOCNLI and RTE), semantic similarity (STS-B and CXC), paraphrasing (MRPC and QQP), and commonsense reasoning (WINOGRANDE, HELLAS-WAG, and COSMOSQA). The systems and methods can observe that QNLI, which may be an NLI task built from the SQUAD dataset, may not be closely linked to SQUAD; which can suggest that the task embeddings may be more sensitive to the type of task than domain similarity. In some implementations, the task embeddings may capture the unintuitive case of RECORD's high transferability to WSC. Additionally and/or alternatively, task embeddings that may be derived from different prompts of the same task may have high similarity scores.

In some implementations, the systems and methods can predict transferability via similarity. For example, the systems and methods can leverage the task embeddings to predict and exploit task transferability. More specifically, the systems and methods can predict the most beneficial source tasks for a given target task and can then make use of the source task prompts to improve performance on the target task. To enlarge the set of source prompts, the systems and methods can use the prompts from each of the three different prompt tuning runs on each source task, resulting in 48 source prompts. Given a target task t with task embedding $e_t$, the systems and methods can rank all the source prompts $\rho_s$ with associated embeddings $e_s$ in descending order by similarity, sim($e_s$, $e_t$). In addition, the systems and methods can denote the ranked list of source prompts as $\rho_{sr}$, where r denotes the rank (r=1, 2, . . . , 48). Experiments can then be performed with three methods for using the ranked source prompts: best of top-k, top-k weighted average, and/or top-k multi-task mixture.

The best of top-k method can include selecting the top-k source prompts and can use each of them individually to initialize the target prompt. The method can include prompt tuning k times on the target task t. The best individual result may be used for evaluating the effectiveness of the method.

The top-k weighted average method can include initializing the target prompt with a weighted average of the top-k source prompts $$\sum_{r=1}^k \alpha_r \rho_{Sr}$$

such that the systems and methods may only perform prompt tuning on the target task t once. The weights $\alpha_r$ may be computed as:

$$\alpha_r = \frac{sim(e_S, e_t)}{\sum_{r=1}^k \alpha_r \rho_{Sr}}$$

where $e_{Sr}$ denotes the corresponding task embedding of $\rho_{Sr}$.

The top-k multi-task mixture method can include first identifying the source tasks whose prompts are in the top-k prompts and can mix their datasets and the target dataset together (e.g., using a examples-proportional mixing strategy). In some implementations, the systems and methods can perform source prompt tuning on the multi-task mixture and can use the final prompt checkpoint to initialize the target prompt.

The systems and methods can observe a significant positive correlation between task embedding similarity and task transferability on four (out of 10) target tasks, including STS-B (p<0.001), CB (p<0.001), WSC (p<0.01), and RTE (p<0.05). In some instances (e.g., on BOOLQ), the experimental results can convey a large relative error reduction (19.0%, achieved by a source prompt of MNLI) despite a low cosine similarity (0.4). The results can suggest that factors other than task similarity (data size, task difficulty, domain similarity, etc.) may also play a role in determining transferability.

Retrieving targeted source tasks via task embeddings may be helpful. Table 3 can convey a comparison between different methods for identifying which source prompts could be beneficial for a given target task. The results can show the effectiveness of best of top-k. Simply choosing the source prompt with the highest task embedding similarity to the target task using per-token average cosine similarity can improve over the baseline by a large margin (from an average score of 74.7 to 76.7, a 12.1% average relative error reduction). Trying all the top-3 (out of 48) source prompts for each target task can yield an average score of 77.5. With larger values of k, the systems and methods can retain most of the benefits of oracle selection (80% of the gain in terms of average score with k=9 and 90% with k=15), while still eliminating over ⅔ of the candidate source prompts. Top-k weighted average can have similar average performance to best of top-k with k=1 but may achieve lower variance. Therefore, the top-k weighted average may be an alternative to best of top-k in scenarios where trying multiple prompt tuning runs on the target task is computationally prohibitive. Additionally and/or alternatively, top-k multi-task mixture may provide a means of obtaining strong performance with an average score of 77.8, even outperforming best of top-k with k≤3.

| Method Change | Avg. score | | |
|---|---|---|---|
| | Abs. | Rel. | |
| BASELINE | — | — | $74.7_{0.7}$ |
| BRUTE-FORCE SEARCH (k = 48) | | | |
| ORACLE | $6.0_{0.5}$ | $26.5_{1.1}$ | $80.7_{0.0}$ |
| COSINE SIMILARITY OF AVERAGE TOKENS BEST OF TOP-k | | | |
| k = 1 | $1.5_{0.5}$ | $11.7_{1.1}$ | $76.2_{0.1}$ |
| k = 3 | $2.7_{0.6}$ | $16.6_{1.1}$ | $77.4_{0.3}$ |
| k = 6 | $3.8_{0.1}$ | $20.0_{1.1}$ | $78.5_{0.5}$ |
| k = 9 | $4.5_{0.4}$ | $22.2_{1.1}$ | $79.2_{0.1}$ |
| k = 12 | $5.0_{0.9}$ | $23.6_{2.2}$ | $79.7_{0.4}$ |
| k = 15 | $5.4_{0.8}$ | $24.9_{1.8}$ | $80.1_{0.3}$ |
| PER-TOKEN AVERAGE COSINE SIMILARITY BEST OF TOP-k | | | |
| k = 1 | $2.0_{0.4}$ | $12.1_{1.1}$ | $76.7_{0.7}$ |
| k = 3 | $2.9_{0.6}$ | $17.0_{0.6}$ | $77.5_{0.4}$ |
| k = 6 | $4.5_{0.5}$ | $22.1_{1.2}$ | $79.2_{0.1}$ |
| k = 9 | $4.6_{0.5}$ | $22.6_{0.9}$ | $79.5_{0.2}$ |
| k = 12 | $5.0_{0.6}$ | $23.5_{1.4}$ | $79.6_{0.1}$ |
| k = 15 | $5.3_{0.9}$ | $24.5_{2.2}$ | $80.0_{0.4}$ |
| TOP-k WEIGHTED AVERAGE | | | |
| best k = 3 | $1.9_{0.5}$ | $11.5_{2.7}$ | $76.6_{0.1}$ |
| TOP-k MULTI-TASK MIXTURE | | | |
| best k = 12 | $3.1_{0.5}$ | $15.3_{2.8}$ | $77.8_{0.1}$ |

Table 3 can depict that task embeddings can provide an effective means of predicting and exploiting task transferability. Using best of top-k with k=3 can improve over BASELINE (prompt tuning on each task from scratch) by +2.8 points. With larger values of k (≤15), the systems and methods can retain most of the benefits conferred by oracle selection. For top-k weighted average and top-k multi-task mixture, the systems and methods can experiment with different values of k∈{3, 6, 9, 12} and can report the best results.

Table 4 can show the performance of different model tuning and prompt tuning methods on the SUPERGLUE benchmark.

| Method | Model size | | | | |
|---|---|---|---|---|---|
| | SMALL | BASE | LARGE | XL | XXL |
| PROMPTDESIGN (GPT-3) | 40.6 | 43.4 | 45.1 | 47.8 | 52.8 |
| MODELTUNING | $62.8_{0.8}$ | $73.7_{0.6}$ | $81.3_{0.6}$ | $83.1_{0.2}$ | $89.9_{0.2}$ |
| PROMPTTUNING | $59.8_{0.8}$ | $63.1_{1.1}$ | $74.5_{2.2}$ | $79.2_{0.9}$ | $88.8_{0.2}$ |
| MULTI-TASKMODELTUNING | $64.6_{0.2}$ | $79.2_{0.3}$ | $84.5_{0.1}$ | $88.0_{0.5}$ | $90.1_{0.2}$ |
| SPOT (OURS) | $64.5_{0.3}$ | $73.2_{0.3}$ | $82.7_{0.2}$ | $88.7_{0.3}$ | $91.2_{0.1}$ |

For example, Table 4 can depict SUPERGLUE performance of different model tuning and prompt tuning methods across model sizes. The results can report the mean and standard deviation (in the subscript) across three random seeds. SPOT can outperform vanilla prompt tuning and GPT-3 by a large margin, matching or outperforming model tuning across all model sizes. At the XXL model size, SPOT can outperform multi-task model tuning, which finetunes the entire model on the GLUE mixture before fine-tuning the parameters on individual SUPERGLUE tasks.

The experiments and/or the training can utilize 55 labeled datasets. The datasets can be obtained from common NLP benchmarks/families of tasks.

For prompt tuning, the systems and methods can initialize the prompt tokens with embeddings that represent an enumeration of the output classes with a back off to sampled vocabulary to fill any remaining prompt positions.

For model tuning approaches, the experiments can use the default hyperparameters for T5, i.e., learning rate 0.001, an Adafactor optimizer with pre-training parameter states restored, and dropout probability 0.1. To improve the model tuning baselines, the experiments can include performing a sweep over the batch size hyperparameter and can select $2^{16}$ tokens per batch.

Table 5 can be descriptive of positive transfers with more than 10% relative error reduction on the target task. The transfer can denote the transfer from a source task to a target task.

| Transfer | Increase (relative) |
|---|---|
| MNLI → CB | 58.9 |
| MNLI → COPA | 29.1 |
| RECORD → WSC | 20.0 |
| MNLI → RTE | 19.2 |
| RECORD → MRPC | 18.7 |
| SQUAD → MRPC | 18.7 |
| CXC → WIC | 18.1 |
| MNLI → BOOLQ | 17.0 |
| MNLI → MRPC | 16.5 |
| QNLI → WIC | 16.5 |
| MNLI → WIC | 16.2 |
| CXC → STS-B | 16.0 |
| DROP → MRPC | 15.1 |
| SQUAD → COPA | 14.5 |
| QQP → MRPC | 14.4 |
| CXC → MRPC | 13.7 |
| C4 → MRPC | 13.7 |
| COSMOSQA → MRPC | 12.9 |
| COSMOSQA → COPA | 12.9 |
| QQP → COPA | 12.2 |
| QNLI → MRPC | 12.2 |
| QQP → WIC | 11.8 |
| MNLI → STS-B | 11.8 |
| SQUAD → BOOLQ | 11.1 |
| QQP → STS-B | 10.9 |
| QQP → BOOLQ | 10.7 |
| CXC → BOOLQ | 10.7 |
| DROP → WIC | 10.7 |
| QQP → RTE | 10.5 |
| C4 → BOOLQ | 10.4 |

Example Source Prompt Tuning

The systems and methods disclosed herein can include training and utilizing soft prompts for conditioning task performance of pre-trained machine-learned models. For example, the systems and methods disclosed herein can prompt tune in order to train prompts, which can be input with input data to condition a large pre-trained model to perform a specific task. In particular, one particular use can involve inputting the learned prompt and a set of input text into a large pre-trained language model in order to obtain an output that accurately reflects the desired task of the user without having to retrain the model for the specific natural language processing task. For example, the systems and methods can include obtaining a training dataset. In some implementations, the training dataset can include a plurality of training examples and a plurality of training labels for the respective training examples. One or more training examples of the plurality of training examples and a prompt can be processed with a pre-trained machine-learned model to generate a training output. In some implementations, the plurality of pre-trained parameters for the pre-trained machine-learned model can be fixed during prompt tuning. The prompt can be associated with a particular task, and the particular task can be associated with the one or more training examples. A prompt gradient can be determined based at least in part on a comparison between the training output and one or more training labels associated with the one or more training examples. The systems and methods can include adjusting one or more prompt parameters of the prompt based on the prompt gradient. The prompt can be trained for a particular task associated with the one or more training examples and the one or more training labels such that the prompt is configured to be input with input data to the pre-trained machine-learned model to generate output data associated with the particular task.

In some implementations, a training dataset can be obtained. The training dataset can include a plurality of training examples and a plurality of training labels for the respective training examples. In some implementations, the plurality of training examples can include a plurality of text datasets. The particular task can be a natural language processing task. In some implementations, the training dataset can include a plurality of text examples and a plurality of classifications associated with the plurality of text examples. Alternatively and/or additionally, the training dataset can include a plurality of visual examples (e.g., a plurality of images) and a plurality of classifications (e.g., object classifications in an image, an image classification, a semantic classification, etc.) associated with the plurality of visual examples.

The systems and methods can include processing one or more training examples of the plurality of training examples with a pre-trained machine-learned model to generate a training output (e.g., a classification output, a detection output, a completion output, an augmentation output, etc.). In some implementations, the pre-trained machine-learned model can process the one or more training examples and a prompt. The plurality of pre-trained parameters for the pre-trained machine-learned model can be fixed during prompt tuning (e.g., the pre-trained machine-learned model can be frozen such that the parameters are not adjusted during training of the prompt parameters). In some implementations, the pre-trained machine-learned model can include a model adapted to generate a text prediction output for text that follows an input text (e.g., the input text can include "the sky is _____" and the output can be "blue"). Alternatively and/or additionally, the pre-trained machine-learned model may have been trained with text masking (e.g., the input text can include "The man _____ old" and the output can be "is"). The pre-trained machine-learned model can include one or more encoder blocks and one or more decoder blocks. For example, the pre-trained machine-learned model can include an encoder-decoder model such as a transformer model.

A prompt gradient can then be determined based at least in part on a comparison between the training output and one or more training labels associated with the one or more training examples. In some implementations, the prompt gradient can be determined by evaluating a loss function that is evaluated based on a difference between the training output and the one or more training labels. The loss function can include a perceptual loss or another loss function. In some implementations, the labels can include ground truth outputs for the respective training examples.

One or more prompt parameters of a prompt can then be adjusted based on the prompt gradient. In some implementations, the prompt can be trained for a particular task associated with the one or more training examples and the one or more training labels such that the prompt is configured to be input with input data to the pre-trained machine-learned model to generate output data associated with the particular task. The particular task can include determining whether the input data comprises content associated with a positive intent. In some implementations, the input data can include visual data. The visual data can include one or more images. In some implementations, the output data can include output visual data, and the output visual data can include one or more images generated based at least in part on the input data and the prompt.

In some implementations, the particular task can include a classification task (e.g., a text classification task, a syntactical classification task, or a sentiment analysis task that classifies whether the input text has a positive sentiment or a negative sentiment). Alternatively and/or additionally, the particular task can include determining a response and/or a follow-up to the input text. For example, the output may be a predicted answer or generated response to an input open ended question. Alternatively and/or additionally, the output may include an augmented version of the input data, which can include correcting data or adjusting data based on the specific task or training dataset. The particular task may include a translation task.

In some implementations, prompt tuning can involve inputting parameters with the input data into the frozen model such that only those parameters are updated. In some implementations, only the initial block (e.g., a small set of parameters at the beginning) may be written and/or overwritten, not the entire model. In some implementations, prompt tuning can include learning vectors for new words and tasks. The parameters may be learned directly based on the label comparison. The prompts can include a plurality of values and/or functions.

Additionally and/or alternatively, the prompt training can include training the model conditioned by the prompt to output the label. In some implementations, the prompt training can include training the model conditioned by the prompt to output the most probable label. Training can involve a perceptual loss and/or a variety of other losses.

In some implementations, the pre-trained machine-learned model can include a transformer model (e.g., a T5 model or a BERT model). The pre-trained machine-learned model can output text that is descriptive of a class in response to receiving the prompt and the input data. In some implementations, the pre-trained machine-learned model can include an encoder-decoder model. The pre-trained machine-learned model can include a large language model pre-trained with mask training. The model can then be adapted by retraining with a large chunk of text to guess what comes next. The training can involve span-corruption and sentinel markers.

The systems and methods can include storing the prompt in a prompt database. The prompt database can include a plurality of prompts associated with a plurality of different tasks. The prompt and the respective task may be paired for storage such that the association can be utilized for obtaining the prompt based on a selection by a user of a desired task.

Additionally and/or alternatively, the systems and methods can include obtaining input text data, processing the prompt and the input text data with the pre-trained machine-learned model to generate output text data, and providing the output text data as an output. In some implementations, the input text data can include one or more words. The output text data can include a plurality of text characters (e.g., a text response, a text classification, a text completion, and/or a text augmentation).

Alternatively and/or additionally, the systems and methods can include obtaining input data (e.g., a set of text, audio data, visual data, and/or latent encoding data). A prompt can be obtained. In some implementations, the prompt can include one or more learned parameters associated with a particular task. The input data and the prompt can be processed with a pre-trained machine-learned model to generate output data. The output data can be associated with the particular task associated with the prompt. The prompt and the pre-trained machine-learned model may have been trained separately. The output data can then be provided as an output (e.g., provided for display in a user interface).

More specifically, the systems and methods can include obtaining input data and a prompt. The prompt can include one or more learned parameters associated with a particular task. In some implementations, the prompt can prime a pre-trained machine-learned model for the particular task. The prompt may be a prompt obtained from a prompt database based on one or more user selections. Additionally and/or alternatively, the prompt may be a prompt generated based on a training dataset that includes a plurality of training examples and a plurality of respective labels. In some implementations, the input data can include text data, image data, video data, audio data, and/or latent encoding data.

The systems and methods can include processing the input data and the prompt with a pre-trained machine-learned model to generate output data. The output data can be associated with the particular task associated with the prompt. In some implementations, the prompt and the pre-trained machine-learned model may be trained separately. Additionally and/or alternatively, the pre-trained machine-learned model can include a generative pre-trained transformer model. The pre-trained machine-learned model can include an autoregressive language model. In some implementations, the pre-trained machine-learned model may be originally trained with text masking and may be re-trained for auto-completion.

The output data can then be provided as output. The output data can include text data, image data, video data, audio data, and/or latent encoding data. The output data can be provided via a user interface. For example, text data descriptive of a classification may be provided in the display of a graphical user interface.

Alternatively and/or additionally, the systems and methods can obtain input data and one or more selections from a user. The one or more selections can be associated with a particular task. In some implementations, the particular task can include a classification task. The output data can include text descriptive of a particular classification associated with the input data. The input data can include text data, image data, video data, and/or latent encoding data. In some implementations, the one or more selections can include one or more selections to a graphical user interface. The one or more selections can be selections that select an element associated with the particular task (e.g., a graphical icon descriptive of the task).

A prompt can then be obtained based on the one or more selections. The prompt can include one or more learned parameters associated with the particular task. In some implementations, the prompt may have been generated by learning the one or more learned parameters by processing training data with the pre-trained machine-learned model. The parameters of the pre-trained machine-learned model can be fixed during learning. The prompt can include less than one one-hundredth of a percentage of a number of parameters of the pre-trained machine-learned model. In some implementations, the prompt can be obtained from a prompt database by searching the database for prompts associated with the selected task.

In some implementations, the input data and the prompt can be processed with a pre-trained machine-learned model to generate output data. The pre-trained machine-learned model can be conditioned by the prompt to generate output data associated with the particular task. The output data can include text data (e.g., one or more words), image data (e.g., one or more images), video data (e.g., one or more videos), audio data (e.g., sound wave data), and/or latent encoding data (e.g., one or more latent representations).

The output data can then be provided as an output to the user. The output data may be generated by a server computing system and may then be transmitted to a user computing system. In some implementations, the output data may be provided via one or more output components of a user computing system.

Additionally and/or alternatively, the systems and methods can include obtaining a second prompt, processing the input data and the second prompt with the pre-trained machine-learned model to generate second output data, and providing second output data to the user. The second prompt can be associated with a second task.

The use of multiple prompts to produce multiple outputs for multiple tasks can be part of prompt ensembling. The prompt ensembling can be completed for any number of prompts. The outputs can then be selected or weighted post generation. Additionally and/or alternatively, prompt ensembling can include pairing the inputs with each prompt of the plurality of prompts and passing all of the pairs through the large frozen pre-trained machine-learned model such that there is at least one output for each prompt. A particular output can be selected based on a preferred prompt or based on a prompt that has the highest correlation to the desired task. In some implementations, the output with the highest confidence score may be provided. Alternatively and/or additionally, a portion of the outputs may be weighted and provided as a weighted output. In some implementations, the plurality of prompts utilized can include a plurality of prompts for the same or similar tasks. The prompts may have been trained with varying training datasets. Prompt ensembling can enable the weighting of a plurality of outputs to get a generalized output. Alternatively and/or additionally, a specific output can be selected based on the highest confidence score, based on repeated outputs, and/or based on a hierarchy of prompts.

Alternatively and/or additionally, the systems and methods can enable a large frozen model to be used to generate respective outputs for many different tasks. Input data can be paired with a plurality of different prompts associated with a plurality of different tasks. The plurality of pairs can be processed with the large frozen model to generate a plurality of outputs. The plurality of outputs can be descriptive of outputs associated with a plurality of different tasks. Therefore, the systems and methods disclosed herein can process input data with the plurality of different prompts to obtain a large amount of data related to the input data. For example, an image can be processed with a plurality of prompts to output data descriptive of image segmentations, image classifications, object classifications, object detections, semantic analysis, etc.

Large pre-trained language models, which are continuing to grow in size, can achieve state-of-art results on many natural language processing (NLP) benchmarks. Since the development of GPT (generative pre-trained transformer) and BERT (bidirectional encoder representations from transformers), other systems may fine-tune the models on downstream tasks, which can involve adjusting every weight in the network (i.e., model tuning). However, as models become larger, storing and serving a tuned copy of the model for each downstream task can become more difficult.

However, the systems and methods may share across all downstream tasks a single frozen pre-trained language model, in which all weights are fixed. A user can prime the model for a given task through prompt design (i.e., hand-crafting a text prompt with a description or examples of the task at hand). For instance, to condition a model for sentiment analysis, one can attach the prompt, "Is the following movie review positive or negative?" before the input sequence, "This movie was amazing!"

Sharing the same frozen model across tasks can simplify serving and can allow for efficient mixed-task inference; however, this can be at the expense of task performance. Text prompts can rely on manual effort to design, and even well-designed prompts may underperform compared to model tuning.

However, prompt tuning can be a more efficient and effective method for conditioning frozen models using tunable soft prompts. Similar to engineered text prompts, soft prompts can be concatenated to the input text. Rather than selecting from existing vocabulary items, the "tokens" of the soft prompt can be learnable vectors. The configuration can lead a soft prompt to be optimized end-to-end over a training dataset. In addition to removing the need for manual design, the prompt tuning can allow the prompt to condense information from datasets containing thousands or millions of examples.

To create a soft prompt for a given task, the system may first initialize the prompt as a fixed-length sequence of vectors (e.g., 20 tokens long). In some implementations, the systems and methods can attach these vectors to the beginning of each embedded input and feed the combined sequence into the model. Alternatively and/or additionally, the systems and methods can put the prompts at different parts of the input and analyze the effect of the different positions. The model's prediction can be compared to the target to calculate a loss, and the error can be back-propagated to calculate gradients, however the system may only apply these gradient updates to our new learnable vectors—keeping the core model frozen. While soft prompts learned in this way may not be immediately interpretable, at an intuitive level, the soft prompt can be extracting evidence about how to perform a task from the labeled dataset, performing the same role as a manually written text prompt, but without the need to be constrained to discrete language.

Practical hyperparameter settings for the system can include a large learning rate (0.3), which can be important for achieving good results.

Since soft prompts may have a small parameter footprint (the system may train prompts with as few as 512 parameters), one can easily pass the model a different prompt along with each input example. This can enable mixed-task inference batches, which can streamline serving by sharing one core model across many tasks.

When evaluated on SuperGLUE and using a frozen T5 model, prompt tuning can significantly outperform prompt design using either GPT-3 or T5. Furthermore, as model size increases, prompt tuning can catch up to the performance level of model tuning. Intuitively, the larger the pre-trained model, the less of a "push" the model needs to perform a specific task, and the more capable the model may be of being adapted in a parameter-efficient way.

The effectiveness of prompt tuning at large model scales can be especially important, since serving separate copies of a large model can incur significant computational overhead.

Another advantage of prompt tuning can be prompt tuning's resilience to domain shift. Since model tuning touches every weight in the network, model tuning can have the capacity to easily overfit on the provided fine-tuning data and may not generalize well to variations in the task at inference time. By comparison, the learned soft prompts of the systems and methods disclosed herein can have a small number of parameters, such that the solutions they represent may be more generalizable.

To test generalizability, the system can train prompt tuning and model tuning solutions on one task and can evaluate zero-shot on a closely related task.

Semantic Search Training, Meta-prompt Training, and Visual Prompt Training

The systems and methods for prompt tuning using one or more machine-learned models can include one or more additional and/or alternative training techniques for training source prompts. The systems and methods for source prompt tuning may include a variety of techniques for prompt generation or tuning. For example, the systems and methods can include semantic searching for finding similar prompts to use for further tuning. Additionally and/or alternatively, the systems and methods can generate and/or utilize a meta-prompt for prompt generation and tuning.

For example, the systems and methods disclosed herein can leverage semantic searching of prompts to obtain larger datasets, which may then be used for prompt tuning or may be used for other purposes. For example, the systems and methods can include obtaining an example dataset. The example dataset can be processed to train a first prompt. In some implementations, the systems and methods can include determining one or more second prompts are associated with the first prompt. One or more second prompt datasets can be determined to be associated with the one or more second prompts. The one or more second prompt datasets can then be used to retrain the first prompt to generate the augmented first prompt.

Additionally and/or alternatively, the systems and methods can include a prompt tuning training API that can allow a user to train a prompt (e.g., for pre-training the source prompt and/or for training the target prompt), to be used with a large frozen model, for their task via interactions with a server and handles the actual model inference. In some implementations, the prompt tuning training API can be used for making predictions with the model and prompt, and therefore, allowing users to leverage a large model without dealing with the issues of deployment. The users can train the prompt without having to reveal their full dataset to the server, and the server may not have to reveal information about the frozen model, like architecture, weights, etc. In some implementations, the prompt may be trained by a user by using the API by utilizing multi-task training. Multi-task training may involve parameters being combined for multiple tasks. Such a system and/or method can allow a user computing device with limited computational resources (e.g., a constrained memory space or limited processing power) and/or a limited amount of data stored thereon to leverage a large model and additional datasets stored in a server to train a prompt for use by the user computing device.

The learned prompts can then be used to create a large database of prompts for dataset mapping. Similarity search in this prompt space can be used to find and retrieve related datasets, ordered by the similarity of the prompt. The returned datasets can then be used for techniques like multi-task learning, curriculum learning, and visualization. Users can submit their own datasets and accompanying prompt to the database.

Prompt tuning can be costly as prompt tuning can involve forward and backward passes of large models, making the process hard to scale to thousands and thousands of tasks. Therefore, the systems and methods may utilize a meta-prompt for source prompt generation, a prompt that generates prompts, and the meta-prompt can be used to generate prompts for a large variety of tasks.

Additionally and/or alternatively, prompt tuning can be used to produce a meta-prompt from a representative part of a dataset. The meta-prompt can then be used to generate prompts. These generated prompts can then be used with input examples to solve a task and/or can be used to initialize the training of new target prompts.

In some implementations, the systems and methods can be applied to natural language processing but may be trained for computer-vision tasks.

A prompt can correspond to and/or represent a task. In some implementations, prompts can be trained to generate data associated with a respective dataset. Moreover, the prompts can include one or more learned parameters representative of a task.

In particular, the systems and methods disclosed herein can include one or more of semantic search for prompt tuning, meta-prompt generation and use, prompt tuning training API, and vision prompt tuning. Example implementations of each aspect can be implemented and configured in a variety of ways as disclosed below. Each aspect can be implemented individually or in any combination. For example, in one example implementation, a meta-prompt can be generated and used to generate a prompt, the prompt can be used as a query for semantic search, and the results can be used for tuning the generated prompt and the meta-prompt. These aspects can be implemented into a prompt tuning training API for individual task training or for multi-task training. In some implementations, the prompts can be vision prompts generated based on vision task training (e.g., pad tuning training, channel tuning training, mask tuning training, and/or prompt tuning for a vision transformer).

The systems and methods disclosed herein can leverage semantic searching of prompts for prompt tuning. In some implementations, the systems and methods can include obtaining an example dataset from a user.

The example dataset can be processed with a machine-learned model to train a first prompt. In some implementations, the first prompt can be trained to generate data associated with the example dataset. In some implementations, the systems and methods can include using a prompt tuning training application programming interface. The prompt tuning training application programming interface can include one or more machine-learned models, and the one or more machine-learned models may include the one or more prompt tuning models.

The systems and methods can then determine one or more second prompts are associated with the first prompt. The one or more second prompts can be obtained from a plurality of stored prompts stored on a server computing system.

In some implementations, a search of a prompt repository can be performed to identify similar prompts to the first prompt. The one or more second prompts can then be determined based on the search of the prompt repository. The prompt repository can include a library of pretrained prompts. In some implementations, the prompt repository can include prompts generated based on datasets from a plurality of users.

In some implementations, the systems and methods can include generating a similarity score for each of the one or more second prompts. The similarity scores can be determined based on a similarity between the first prompt and the second prompt. Additionally and/or alternatively, determining the one or more second prompts can include a semantic search. In some implementations, the semantic search can include the use of an L2 metric, a cosine metric, or a max product metric. In some implementations, semantic search can be utilized for training and/or re-training source prompts, and soft prompt transfer learning can be utilized for training and/or generating target prompts.

In some implementations, the one or more second prompts can be determined based on a semantic search of a library of prompts stored with associated metadata for each respective prompt of the library of prompts. The associated metadata can include at least one of a frozen model utilized for training the respective prompt, a training date for the respective prompt, or a training dataset for the respective prompt.

The systems and methods can then generate an augmented first prompt with the machine-learned model based at least in part on the one or more second prompts. Generating the augmented first prompt can involve retraining the first prompt on one or more second prompt datasets associated with the one or more second prompts with the highest similarity scores.

In some implementations, the systems and methods may include obtaining second prompt metadata associated with the one or more second prompts. The second prompt metadata can include one or more second prompt datasets associated with the one or more second prompts. The second prompt metadata and the example dataset can be processed with the machine-learned model to generate the augmented first prompt. In some implementations, generating the augmented first prompt can include multi-task learning based on the one or more second prompts. In some implementations, mixture rates (e.g., how much of each dataset to use) can be based on prompt similarity. Additionally and/or alternatively, generating the augmented first prompt can include curriculum learning based at least in part on the one or more second prompts. In some implementations, generating the augmented first prompt can include using the second prompts as an initialization point for retraining the initial prompt. Additionally and/or alternatively, the second prompt (s) can be used to generate combinations of the prompt. The generated and/or re-trained prompt can be stored to be later utilized as a source prompt for initializing the training of a new target task prompt.

The augmented first prompt can then be utilized to generate one or more datasets, which can then be stored in a database to train or retrain future prompts. In some implementations, the augmented first prompt can be stored in a library of prompts and may be used for semantic search prompt tuning of other prompts.

The systems and methods disclosed herein can use prompt tuning to build a representation of a dataset (the prompt) that can be used to build a semantic search over datasets. The results from querying the database can then be used to augment the user's dataset or training procedure in various ways.

The systems and methods for prompt tuning utilizing semantic search can receive a small dataset from a user to train a prompt, and the trained prompt can then be used to search for similar prompts for prompt tuning (e.g., prompt retraining). The users can have a small dataset they want to expand, augment, do better on, quantify, or overall refine. The user can send one or more (example, label) pairs to be used as input for the prompt tuning system. In some implementations, the prompt tuning system can include one or more prompt tuning machine-learned models and/or a prompt training application programming interface (API).

For example, a user can have one-or-few-shot examples for a task they want to do well on. Instead of collecting more data, the users can utilize a prompt tuning semantic search feature to find datasets, tasks, and prompts that are similar to their task. In some implementations, the prompt tuning semantic search can begin with a user sending a prompt tuning API a small dataset of examples.

An initial/query prompt (e.g., a low quality prompt) can be trained with the dataset. For example, the server, or the server in coordination with the user via the prompt tuning API, can train an initial prompt based on the examples the user provides. Alternatively and/or additionally, the first prompt may be generated with the use of a meta-prompt for prompt generation.

A semantic search can then be completed to find one or more associated prompts (e.g., similar pretrained prompts). For example, the semantic search can involve comparing the initial/query prompt to a library of pretrained prompts, supplied by the service/cloud provider for various tasks. Each prompt can have associated metadata. Multiple metrics such as L2, cosine, or max product can be used to determine similar prompts.

The initial user prompt, or first prompt, can then be utilized for semantic search over a library of prompts (e.g., a library of second prompts, in which the library of second prompts includes pretrained prompts trained based on datasets not used by the user). These prompts can have associated metadata, such as the frozen model used, the date trained, and, most importantly, the dataset used.

The search can use a similarity function between prompts such as cosine distance. In some implementations, the library of prompts can be built by pre-training a plurality of prompts on a large collection of open-source tasks/datasets. The library of prompts can be stored on a server computing system that allows other users to upload their own prompts for generating a larger library. User supplied prompts can be provided as freely accessible to all or can be provided as restricted to certain users (e.g., a prompt may only be accessible to users with certain credentials or may be accessible in exchange for other resources), establishing a service for curated datasets. The utility of the prompts can be determined by a variety of metrics and the determined utility may be utilized for prompt ranking and/or for user ranking. In some implementations, the library of prompts can include prompts trained on a single dataset and/or prompts trained on a plurality of datasets. The prompts may represent a particular task.

The prompts (i.e., second prompts) determined to be associated with the first prompt and the metadata related to those prompts, can be ordered by their similarity to the query prompt. The second prompts, and associated metadata such as links to the dataset and prompt submitter information, can be returned to the user. The second prompts and/or their associated metadata can then be utilized to retrain or refine the first prompt. The prompt tuning can involve curriculum learning, multi-task learning, and/or retraining with the most similar second prompts being utilized as initialization points.

For example, the returned datasets associated with the second prompts can be utilized for curriculum learning. Curriculum learning can involve ordering the datasets by how similar their respective prompt is to the user prompt, before finally re-training on their own dataset to create a final prompt (e.g., a source prompt, which can then be added to a prompt database to be later used for initializing the training of a target prompt). Therefore, the users can use the returned datasets to do curriculum learning. Training on one task at a time ordered by increasing similarity to their task before finally retraining with their original examples. In some implementations, the order can be determined based on prompt similarity.

Another possible implementation for prompt tuning with the second prompts can involve determining the most similar second prompt or a combination of the most similar second prompts and using the one or more determined most similar prompts as the initialization for another round of training.

For example, the users can use the prompts returned as an initialization point for their prompt. The initialization point setting can be done with the most similar prompt or a combination of multiple prompts. The combination of the multiple prompts can be weighted by the similarity of the prompt. Alternatively and/or additionally, the combination can include a default equal combination.

Alternatively and/or additionally, the returned datasets associated with the second prompts can be used for multi-task learning in conjunction with the user-input dataset (i.e., example dataset). In some implementations, the users can use the returned datasets for multi-task learning to boost performance on their actual task. The mixing rates of different datasets can be adjusted based on the similarity of the dataset's respective prompt and the initial user prompt.

Alternatively and/or additionally, a user can utilize the resulting tasks for a variety of uses (e.g., visualization, ranking of task difficulty, etc.). The user may be able to contact the original developers of these prompts via the user interface of the semantic search prompt tuning API in order to collaborate on future work.

The systems and methods can be repeated iteratively to continue to refine, or tune, the prompt. The user may repeat this process, using the resulting prompt, until the user reaches a result they are happy with. Moreover, in some implementations, after the first cycle the user can send the resulting prompt directly to the semantic search API, instead of re-training a prompt on the user examples. The systems and methods disclosed herein can also allow for use of the semantic search API for other applications such as task search and task complexity analysis.

Benefits of leveraging semantic search for prompt tuning can include enabling the use of similar datasets (e.g., for data augmentation) to increase user model performance. Moreover, the systems and methods for prompt tuning using semantic search can allow for the use of public datasets and can allow for the addition of user datasets to the collection. In addition, the systems and methods can be implemented to allow users a medium to find others working on similar problems and reach out for collaboration.

Additionally and/or alternatively, the systems and methods disclosed herein can be utilized for generating a meta-prompt that can generate prompts based on an input. For example, the meta-prompt can be a prompt that is trained to generate prompts based on input datasets or input descriptions.

The systems and methods can include obtaining a plurality of training datasets. The plurality of training datasets can be obtained from a user computing device, and the meta-prompt can include a user-specific meta-prompt. Alternatively and/or additionally, the meta-prompt may include a general purpose meta-prompt.

The plurality of training datasets can be processed to train a training prompt for each respective dataset. In some implementations, the training prompt can be trained to generate data associated with the respective dataset.

One or more canonical examples can be selected from each of the plurality of training datasets. In some implementations, selecting the one or more canonical examples from each of the plurality of training datasets can include determining a specific training dataset from each of the plurality of training datasets based on a dataset-specific prompt generated based at least in part on the specific training dataset and a frozen model.

The systems and methods can include generating an example dataset based on the plurality of canonical examples.

The example dataset can then be utilized to generate a meta-prompt. In some implementations, the meta-prompt can be configured to generate a predicted prompt based on the plurality of canonical examples.

After the meta-prompt is generated, the systems and methods can further train the meta-prompt for refined prompt generation. The systems and methods for training and refining the meta-prompt can include obtaining an aggregated dataset. The aggregated dataset can include an aggregated example and a respective label. The aggregated example and the meta-prompt can be processed with a prompt creation model to generate a task-specific prompt for the second example dataset. The task-specific prompt and the second example dataset can then be processed with a prediction model to generate a prediction. The prediction and the respective label can then be compared in order to evaluate a loss function. One or more parameters of the meta-prompt can then be adjusted based on the gradient of the loss function.

Alternatively and/or additionally, the meta-prompt can be tuned or refined by obtaining an aggregated example, in which the aggregated dataset can include a task description. The systems and methods can process the task description and the meta-prompt with a prompt tuning model to generate a task-specific prompt for the task description. The task-specific prompt, an example, and the task description can be processed with a prediction model to generate a prediction. The prediction can then be used in order to evaluate a loss function (e.g., the loss function may be evaluated by comparing the prediction and a respective label for the example.). One or more parameters of the meta-prompt can then be adjusted based on the loss function.

Once the meta-prompt is generated, the meta-prompt can be stored on a server computing system to be utilized for prompt generation and refinement. The systems and methods for prompt generation can include receiving a prompt request from a user computing device and generating a requested prompt based on the prompt request and the meta-prompt. The requested prompt can then be sent back to the user computing device.

Prompt tuning can involve a large labeled dataset where the prompt representation is learned via back propagation. However, that technique can involve full forward and backwards passes of the model. Therefore, the computational complexity of prompt tuning can be the same as model tuning despite prompt tuning only updating a single parameter. Thus, the training can still be costly, especially if one intends to create a huge library of prompts.

The systems and methods disclosed herein can be utilized for generating a meta-prompt, which can reduce the computational cost for generating and tuning prompts. A meta-prompt can be a prompt, learned via prompt tuning, that when processed with a few input examples produces a prompt. The output prompt can be used by the machine-learned model (e.g., the frozen model) to solve the task sketched by the input examples. The meta-prompt can enable the scaling to a library of millions of prompts.

Generating a meta-prompt can involve processing a plurality of datasets, a plurality of labels, and a plurality of prompts in order to train one or more parameters that can allow the meta-prompt to generate prompts based on input datasets. The trained meta-prompt can be used for generating prompts on out of domain datasets and/or may be used to generate new or refined prompts for in-domain datasets.

For example, the systems and methods for generating a meta-prompt can include generating or obtaining a plurality of datasets. The plurality of datasets can include a variety of datasets representative or descriptive of a plurality of different tasks. The plurality of datasets can be obtained from a public repository and/or generated with one or more machine-learned models. In some implementations, the plurality of datasets can include public datasets, synthetic datasets harvested from the web, internal datasets, etc. The datasets can be vertical specific to create several meta-prompt offerings, each catering to users from different domains.

The systems and methods for training and/or generating a meta-prompt can include training a training prompt for each dataset of the plurality of datasets. Each dataset can be processed to generate the training prompt for each respective dataset. The dataset and prompt pairs can then be used to generate a meta-prompt or may be used to generate a database or library to enable the semantic search prompt tuning discussed herein. In some implementations, a frozen model can be used for training and/or may be used for implementation of the meta-prompt prompts.

The systems and methods can then include selecting canonical examples from the dataset. In some implementations, the canonical examples can be selected based on the generated prompt. The canonical examples can be representative examples from the datasets. In some implementations, five to ten examples can be selected from each dataset, in which each example is representative of that dataset. Additionally and/or alternatively, a frozen model can be used for selection.

Data selection may involve selecting examples whose model encoding is most similar to the centers of k-means clusters, selecting examples who are close to the decision boundary of the prompted model, and/or selecting examples that are similar but have opposite labels. In some implementations, data selection can be exposed as a secondary service to help users generate prompts later on.

The canonical examples can then be used to generate a dataset of few-shot examples for the prompts. The few-shot examples for the prompts, or example dataset, can then be utilized to train, or generate, a meta-prompt. Generating, or training, a meta-prompt that generates prompts can involve processing the example dataset and prompt pairs of the example dataset with a machine-learned model. The input to the model can be the prompt and the (input, output) pairs (e.g., an example and a prompt) that make up the examples.

The model can output a prompt with the first K tokens of the encoder. A loss can be calculated between the predicted prompt and the actual prompt produced for this dataset. The losses can include, but are not limited to, L2, Von Mises Fisher, and/or Cosine Distance.

When paired with examples from a dataset the meta-prompt can be used to generate a new prompt that will solve the task specified by the examples. In some implementations, the frozen model can be used to generate the prompts. Reading the example text can involve language understanding using a strong pretrained encoder. The strong pretrained encoder can process the input the same way the prompted frozen model can.

In some implementations, meta-prompt creation may involve joint training. In some implementations, the systems and methods for meta-prompt tuning can involve inputting a meta-prompt and one of the aggregated datasets into the model. A single meta-prompt variable may be initialized. The variable can be unique, dataset-independent, and may be updated as we train. The prompt variable and one of several aggregated datasets may be fed into our prompt generation model. The model can either be shared or dis-jointed from the pretrained frozen model that may take the output of this model (e.g., the generated prompt) as input. The model and the frozen model may be initialized to match in order to have a shared language understanding.

A dataset may be aggregated (e.g., multiple ways, sampling of examples, concatenation, encoding via a model, selection of representative examples, etc.). The model can output a prompt for that dataset. The prompt generation model can generate a prompt value based on the meta-prompt and the aggregated dataset. The generated prompt can be used with a downstream frozen model to solve examples from our dataset. The prompt can then be repli-cated and added to each example in a batch from the dataset. For example, the generated data-dependent prompt can be added to each example in a batch from the dataset, to be used in prompt tuning.

The data-dependent prompt and example can then be fed into the model to make a prediction. More specifically, in some implementations, the generated prompt and the example batch can be fed into the frozen model, a forward pass can be done, and a prediction can be created. A loss can then be calculated, and the error can be backpropagated all the way back to the meta-prompt producing a gradient. The labels from the example batch are used to calculate a loss and do backpropagation through both networks, all the way back to the meta-prompt.

The meta-prompt can then be updated based on its gra-dient, and the process can be repeated again. Each iteration can use a different dataset, a different batch of examples, a different result of any sampling aggregation, etc.

In some implementations, meta-prompt generation can be provided as a service. For example, a user can send multiple datasets to the server computing system. A user can use the meta-prompt service to generate a meta-prompt that is specific to the user and their data.

The systems and methods for using the meta-prompt service can begin with the user uploading their multiple datasets to the server computing system. To expand the number of datasets, which can increase meta-prompt quality, the user can use the prompt tuning semantic search API to find related datasets to include. In some implementations, the server computing system can generate a meta-prompt based on the supplied user datasets. The model can return the user-specific meta-prompt for the user dataset, and the server computing system can then send the meta-prompt back to the user computing system. The meta-prompt can then be stored by the user computing system to be later used for prompt generation. The generated meta-prompt can then be utilized for model inference and prompt generation. For example, a few-shot dataset can be input as multiple (ex-ample, label) pairs into a model with a meta-prompt in order to generate a prompt, which can be used to solve a task defined by the (example, label) pairs.

In some implementations, examples can be selected with a data selection service that helps select examples that can generate better prompts when used with a frozen model. In some implementations, the inputs and the meta-prompt can be processed by a frozen model. Additionally and/or alter-natively, the user input may include a task to be completed by the prompt to be generated. In some implementations, a server computing system may first train a prompt on the labeled examples and then may use the prompt tuning semantic search API to find one of many meta-prompts that can be specific to some vertical.

The model can output a prompt, which can then be provided to the user who input the dataset. The user may then input the generated prompt and the example into a model for model inference. In some implementations, the prompt can be generated and processed for model inference by a singular model, which can include one or more sub-blocks.

In some implementations, the systems and methods for model inference leveraging a prompt generated with a meta-prompt can involve a server computing system. For example, the server computing system can run the model a first time to generate a task-specific prompt from the example dataset and the meta-prompt. The server computing system can then run the model again. The second time can be with the task prompt and an example input.

The model can be fed the prompt and example input. The model can be the same one used to generate the prompt or may be a different model separate from the first model. The model can then return a prediction. The model can then make a prediction, which can then be returned to the user. In an implementation with a server computing system, the server can return the prediction to the user, the inner loop can be the model inference.

Benefits of a meta-prompt generation and use can include the ability to scale the creation of prompts to many, many more tasks; the ability to create vertical-specific meta-prompts for certain domains; and an API to create client-specific meta-prompts for a specific user.

Additionally and/or alternatively, the systems and meth-ods can be implemented as part of a prompt tuning service (e.g., a prompt tuning user interface may be provided to users as part of a prompt tuning web service). The prompt tuning service can utilize a prompt tuning application pro-gramming interface.

The systems and methods can include obtaining a training example (e.g., an example dataset and a label) and a prompt from a user computing device. In some implementations, the training example can be associated with the prompt. In some implementations, the prompt can include a general prompt and a task-specific prompt.

The training example can include one or more examples and/or one or more task descriptions. The training process can involve supervised training or unsupervised training. Therefore, the training example can be a supervised example or an unsupervised example. In some implementations, the training example can include an example and a label, in which the label is a respective label for the example. Additionally and/or alternatively, the training example can be a fine-tuning example or a pre-training example.

The training example (e.g., the example dataset and the respective labels) and the prompt can be processed with a machine-learned model (e.g., a frozen model) to generate one or more prompt gradients. The prompt gradient can be based at least in part on a difference between the label and a predicted label. The predicted label can be generated based on the example.

Processing the training example (e.g., the example dataset and the label) and the prompt with the frozen model to generate the one or more prompt gradients can include a forward pass of the frozen model with the training example and the prompt; and a backwards pass to return the prompt gradients. The one or more prompt gradients can be sent to the user computing device.

In response to the prompt gradients, the user computing device may receive one or more inputs, which can be used to generate a user-input. The user-input can be sent to the server computing system. The server computing system can receive a user-input to augment the prompt. An augmented prompt can be generated based on the user-input. For example, in some implementations, the user-input can include approval of, or interactions with, the prompt gradient, which can be sent to the server which will cause the server computing system to update and return a new prompt. Alternatively and/or additionally, the user can update the prompt based on the gradient with whatever optimization strategy they want (e.g., in some cases, the user may track an optimizer state, which can be included in a user-input). The updated prompt may then be sent to the server computing system.

Additionally and/or alternatively, the systems and methods can include a training API for prompt tuning that can remove or reduce the computational cost for user computing devices (e.g., a user computing device). The training API for prompt tuning can allow anyone to leverage a large scale model. The training API can allow access to the model itself (e.g., through models as a service, MaaS). The technique can be similar to offering a bare metal/VM server that the user can do what they want with instead of a specific high-level application (e.g., text classification which would be like a managed database instance).

The systems and methods disclosed herein can involve a prompt tuning training API. The prompt tuning training API can be configured to receive data. The data can include an example, a label, and a prompt (e.g., example: str, label: str, prompt: tensor). The data may be input and received by the API in order to train a model on their dataset. In some implementations, the dataset can include a collection of characters (e.g., numbers, letters, or symbols), visual data (e.g., images, videos, iconographic symbols, etc.), and/or audio data (e.g., music data, speech data, etc.).

The API can run the inputs through a forward pass of the frozen model. For example, the server computing system that is optimized for running the frozen model (distributed across machines and datacenters, uses specialized accelerators, and support for model parallelism), can perform a forward pass of the model. The example can be used as an input to the model, and the prompt can be prepended to the input. This forward pass may produce a label and may be used as a prompt tuning inference for the API. In some implementations, the one or more machine-learned models can be frozen in order to batch multiple users. The systems and methods can keep the language model in memory. The stored language model can then be utilized with a plurality of different task prompts to perform a plurality of different tasks.

A backwards pass can then be completed in order to return gradients. More specifically, in some implementations, a standard backpropagation yielding gradients for one or more parameters can be generated based on the loss between the predicted label and the supplied label.

The prompt gradients may be provided to the computing system that input the inputs. The inputting computing system may not have access to the frozen model, and the model as a service (MaaS) computing system may not have access to the full dataset or the prompt parameters and/or may not have ongoing access to the prompt parameters.

The input computing system may update the prompt based on the received gradients using a variety of methods (e.g., user-input updates or automated updates). The process for training may continue until convergence or until the user ends the training process.

Additionally and/or alternatively, the systems and methods disclosed herein can be used for prompt tuning multi-task training and may involve an API configured for prompt tuning multi-task training. The systems and methods can include combining a general prompt and task specific prompt (e.g., a user may combine a general prompt for a group of tasks and a task-specific prompt for a specific task.).

Moreover, the combination can include a shared prompt that is the same value for each task and a set of N task prompts, one for each task. The shared parameter can represent a mixture of tasks, or the shared parameter can be used across a whole computing system network, making it more of a user-specific, or network-specific, prompt.

The first step can have a user combine the shared and task-specific prompts through a composition function of the user's choice. Example combinations can include, but are not limited to, addition, concatenation, and projection with an affine transform. The combination can also keep the user in control of the model parameters. In some implementations, the users may send the server a dataset (e.g., example: str, label: str, prompt: tensor).

A forward pass of a frozen model with the prompt can be completed. The optimized server can compute the forward pass based on the user's input example and their prompt, which can be the combination of the shared and task prompts. The output can be a label and can be used for a multi-task inference API.

A backwards pass can then be completed in order to return prompt gradients. The prompt gradients can be based on the predicted label and the user provided label. The combined prompt gradient can be returned back to the user or may be used internally to adjust the parameters of the one or more prompts. In some implementations, the user computing system may update the prompts based on the prompt gradients. For example, updating parameters for their shared prompt and task-specific prompt based on the gradient of the combined prompt. The user can use the gradient of the combined prompts to derive the gradients of the shared prompt and the task-specific prompt. The user can then use these parameters to update each prompt using whatever update rules they choose.

The user can then repeat the process for other examples in their various task datasets. The user can update their prompts with a variety of techniques. The system can repeat this processing, varying the input example, the task they are running (and therefore the task specific prompt) while using the same shared prompt.

Benefits of the API systems and methods can include the model can be utilized by a plurality of users, while limiting the details and parameters shared between users, and a user can produce several prompts for a simple ensemble effect. Furthermore, by leveraging the computational resources of a server and the datasets stored thereon, a user can train prompts on a user computing device with limited computational power and with limited data. Typically, such user computing devices have constrained memory spaces that cannot be used to store large models and a large amount of training data.

The systems and methods disclosed herein can be utilized for prompt tuning for natural language processing tasks, computer vision tasks (e.g., the input to the model can be a prompt alongside an image, and the output can be an image classification and/or the location of objections in the image), audio processing tasks (e.g., he input to the model can be a prompt alongside an audio sample, and the output can be a classification of the audio sample), or a variety of other tasks. Prompt tuning for vision tasks can involve one or more of pad tuning, channel tuning, mask tuning, and/or prompt tuning for a vision transformer. For the prompt tuning, a set of inputs and a learnable prompt can be processed with one or more machine-learned models with a standard forward pass to generate a prediction. The prediction can then be compared against a respective label (e.g., a ground truth label for the respective inputs and prompt) in order to evaluate a loss function. The results of the loss function can be output after a backwards pass where only the prompt is updated.

For pad tuning, the learnable variable can be a border around the image (e.g., the learnable variable can be encoded in a strip of pixels of a fixed width running around the edge of the image). For channel tuning, the learnable variable can be another channel of the input. For example, the image may include three color channels and a prompt channel. For mask tuning, the learnable variable can be a mask that is applied to the input. Additionally and/or alternatively, prompt tuning for a vision transformer can involve unrolling the image into a sequence of patches (e.g., inputs) like in a vision transformer and can then apply prompt tuning to the sequence of patches.

The systems and methods disclosed herein can be used to generate one or more prompts for image-based tasks. The systems and methods can then be used for image processing. For example, the systems and methods can include obtaining an input image and a prompt. The prompt can be structured as at least one of a padding variable around the border of the input image, a channel variable for the input image, or a mask variable for the input image. In some implementations, the systems and methods can include processing the input image with a machine-learned model to generate a prediction. The prediction can be a generated classification (e.g., data indicative of a classification of the image into one of a plurality of classes, such as a probability distribution over classes), a generated image caption, a generated new image, a generated augmented image, a text document based on the input image, and/or object detection (e.g., the location of an object in the image that corresponds to the prompt). The systems and methods can include providing a prediction as an output. The prediction may be provided to a user computing device. In some implementations, the prediction can be provided as part of a user interface associated with application programming interface provided as part of a prompt model inference service.

The systems and methods disclosed herein can use a variety of machine-learned model architectures with a variety of sub-blocks. For example, the systems and methods can utilize a transformer for training and/or using the prompts. Moreover, the prompts can be used to complete a variety of different tasks for a variety of different fields of study or work.

Training a prompt can be trained with one or more training processes for training one or more parameters. In some implementations, a prompt can be trained similarly to training a machine-learned model. Moreover, in some implementations, a machine-learned model and the prompt can be trained simultaneously. Alternatively and/or additionally, the prompt can be trained as an extension of the machine-learned model.

In some implementations, systems and methods for training a prompt can include inputting a prompt into a machine-learned model to generate an output (e.g., the prompt can correspond to a question, and the output can be an answer.). The output can be analyzed, and the results of the analysis can be backpropagated. For example, the output can be assessed or evaluated to determine whether to modify one or more parameters of the prompt. In some implementations, one or more parameters of both the machine-learned model and the prompt may be adjusted in response to the evaluation of the output. Alternatively and/or additionally, the machine-learned model can be held fixed during the training of the prompt.

The systems and methods can include jointly training a prompt tuning model and a meta-prompt. Alternatively and/or additionally, the meta-prompt and the prompt tuning model may be trained separately. Training can involve obtaining a training example and a meta-prompt. The training example and the meta-prompt can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model and/or the meta-prompt may be modified.

In some implementations, training can involve obtaining a training example. The training example can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model may be modified. Assessing the prediction can involve evaluating a loss function by comparing the prediction to a label for the processed dataset.

Moreover, model inference can be completed with or without a meta-prompt. For example, a machine-learned model (e.g., a prompt tuning model) can process a prompt to generate a prediction. In some implementations, the machine-learned model may be fixed. A large frozen model may be utilized for leveraging a large quantity of data. In some implementations, the machine-learned model can process both a prompt and one or more examples in order to generate the prediction. Alternatively and/or additionally, the machine-learned model (e.g., a prompt tuning model) can process a meta-prompt and an example to generate a prediction. The machine-learned model can be configured to utilize the meta-prompt for generating a prompt, and the prompt can be processed to generate the prediction. The prediction can involve generated text data associated with a task, in which the text is generated based on the one or more examples and/or the one or more prompts. In some implementations, the prediction can include text data, audio data, image data, a classification, and/or latent encoding data.

The systems and methods of the present disclosure provide a number of technical effects and benefits. As one example, the system and methods can provide a semantic search that can allow for the determination and isolation of similar prompts to use for retraining or tuning. More specifically, the systems and methods can process an example dataset to generate a first prompt, the first prompt can be semantically searched to find one or more similar second prompts, and the second prompts can be used for retraining.

Another example technical effect and benefit relates to improved computational efficiency and improvements in the functioning of a computing system. For example, a technical benefit of the systems and methods of the present disclosure is the ability to generate meta-prompts, which can be used for generating new prompts. In some implementations, the generated meta-prompts can allow for localized prompt generation with a lessened computational cost. Similarly, prompt tuning with the prompt tuning training API can allow for a user to leverage a server computing system with a database of prompts to generate prompts even if the user has a computing device with limited computational resources.

Another example technical effect and technical benefit of the systems and methods can include the ability to generate and tune prompts for a variety of tasks including natural language processing tasks, computer vision tasks, and/or audio processing tasks. For example, the systems and methods disclosed herein can generate and tune prompts for computer vision using vision models. The use of pad tuning, channel tuning, and/or mask tuning can allow for visual prompts to be trained for data generation.

Semantic search, meta-prompts, application programming interfaces, and/or visual prompt training can be utilized to generate a plurality of source prompts which can be stored in a prompt database. The plurality of source prompts can then be later retrieved and utilized for initializing the training of target prompts.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for soft prompt transfer-learning, the computing system comprising:

one or more processors; and one or more non-transitory computer-readable media that collectively store instructions that, when executed by the one or more processors, cause the computing system to perform operations, the operations comprising:

obtaining target task data, wherein the target task data is associated with a target task for a machine-learned model, wherein the target task data comprises one or more target training examples and one or more target training labels;

processing the target task data to generate a target task embedding;

obtaining, based on an embedding-based search and for initializing target prompt generation, a source prompt from a prompt database based on the target task embedding based on a learned distribution associated with an embedding space, wherein the source prompt is a general source prompt associated with a group of previously-learned tasks, and wherein the source prompt is associated with a source embedding, wherein the source prompt comprises a set of parameters trained for conditioning a pre-trained machine-learned model for the group of previously-learned tasks, and wherein the prompt database comprises a plurality of different pre-trained soft prompts associated with a plurality of different respective task embeddings, and wherein the source prompt is obtained from the prompt database based on determining the source embedding is associated with the target task embedding;

processing the source prompt and the target task data with the pre-trained machine-learned model to generate one or more outputs;

generating a target prompt for the target task based on the source prompt and the one or more outputs, wherein generating the target prompt comprises adjusting one or more parameters of set of parameters of the source prompt based on an evaluation of the one or more outputs, wherein the one or more parameters of the set of parameters are adjusted without adjusting parameters of the pre-trained machine-learned model, and wherein the one or more parameters are adjusted to train the set of parameters for conditioning the pre-trained machine-learned model to perform the target task; and storing the target task embedding and the target prompt in the prompt database.

2. The system of claim 1, wherein generating the target prompt comprises:

evaluating a loss function based on the one or more outputs; and adjusting the one or more parameters of the source prompt based on the loss function.

3. The system of claim 1, wherein the operations further comprise:

obtaining input data; and processing the input data and the target prompt with the pre-trained machine-learned model to generate a target task output, wherein the target task output is associated with the target task.

4. The system of claim 1, wherein processing the target task data to generate the target task embedding comprises learning one or more embedding parameters based at least in part on the target task data.

5. The system of claim 1, wherein obtaining the source prompt from the prompt database based on the target task embedding comprises:

determining the target task embedding is associated with the source embedding; and obtaining the source prompt associated with the source embedding.

6. The system of claim 1, wherein the source prompt was pre-trained on a plurality of different training datasets associated with a plurality of different tasks.

7. The system of claim 1, wherein the operations further comprise:

obtaining a first source task dataset, wherein the first source task dataset is associated with a first task;

generating a first source embedding based on the first source task dataset by partially training a plurality of first source parameters;

generating a first source prompt based on the first source task dataset by further training the plurality of first source parameters; and storing the first source prompt and the first source embedding in the prompt database.

8. The system of claim 7, wherein the operations further comprise:

obtaining a second source task dataset, wherein the second source task dataset is associated with a second task;

generating a second source embedding based on the second source task dataset by partially training a plurality of second source parameters;

generating a second source prompt based on the second source task dataset by further training the plurality of second source parameters; and storing the second source prompt and the second source embedding in the prompt database.

9. The system of claim 8, wherein obtaining the source prompt from the prompt database based on the target task embedding comprises:

determining the first source embedding is more similar to the target task embedding than the second source embedding;

determining the first source prompt is the source prompt based on the first source embedding being more similar to the target task embedding than the second source embedding; and obtaining the first source prompt from the prompt database.

10. The system of claim 1, wherein obtaining the source prompt from the prompt database based on the target task embedding comprises: determining a particular source embedding associated with the target task embedding based on a learned distribution associated with an embedding space.

11. A computer-implemented method for prompt tuning, the method comprising:

obtaining, by a computing system comprising one or more processors, a first task dataset, wherein the first task dataset is associated with a group of first tasks;

processing, by the computing system, the first task dataset to generate a first source task embedding;

training, by the computing system, a first source prompt based on the first task dataset, wherein training the first source prompt comprises:

processing, by the computing system, the first task dataset and a set of parameters with a pre-trained machine-learned model to generate a first task output; and adjusting, by the computing system, one or more parameters of the set of parameters based on the first task output, wherein the one or more parameters are adjusted to train the set of parameters for conditioning the pre-trained machine-learned model to perform a respective task of the group of first tasks, wherein the first source prompt is a general source prompt trained for conditioning the pre-trained machine-learned model for the group of first tasks;

storing, by the computing system, the first source task embedding and the first source prompt in a prompt database;

obtaining, by the computing system, a target task dataset;

processing, by the computing system, the target task dataset to generate a target task embedding;

obtaining, based on an embedding-based search and for initializing target prompt generation, a source prompt from a prompt database based on the target task embedding based on a learned distribution associated with an embedding space, wherein obtaining the source prompt comprises:

determining, by the computing system, the target task embedding is associated with the first source task embedding;

processing, by the computing system, the target task dataset and the first source prompt with the pre-trained machine-learned model to generate a target task output;

adjusting, by the computing system, one or more parameters of the first source prompt based on the target task output to generate a target task prompt, wherein the one or more parameters of the set of parameters are adjusted without adjusting parameters of the pre-trained machine-learned model, and wherein the one or more parameters are adjusted to train the set of parameters for conditioning the pre-trained machine-learned model to perform the target task; and storing, by the computing system, the target task embedding and the target task prompt in the prompt database.

12. The method of claim 11, wherein the pre-trained machine-learned model comprises a large frozen model, wherein a plurality of pre-trained parameters for the pre-trained machine-learned model are fixed during prompt tuning.

13. The method of claim 11, wherein the respective task of the group of first tasks is descriptive of a text completion task.

14. The method of claim 11, wherein the target task dataset is associated with a target task, and wherein the target task is descriptive of a sentiment classification task.

15. The method of claim 11, wherein determining the target task embedding is associated with the first source task embedding comprises:

generating a similarity score based on a similarity between the target task embedding and the first source task embedding.

16. One or more non-transitory computer-readable media that collectively store instructions that, when executed by one or more computing devices, cause the one or more computing devices to perform operations, the operations comprising:

obtaining target task data, wherein the target task data is associated with a target task for a machine-learned model;

obtaining, based on an embedding-based search and for initializing target prompt generation, a source prompt from a prompt database based on the target task data based on a learned distribution associated with an embedding space, wherein the source prompt is a general source prompt associated with a group of previously-learned tasks, wherein the source prompt comprises a set of learned parameters representative of a group of source tasks, and wherein the source prompt is associated with a source embedding, wherein the source prompt comprises the set of learned parameters trained for conditioning a pre-trained machine-learned model for the group of previously-learned tasks, and wherein the prompt database comprises a plurality of different pre-trained soft prompts associated with a plurality of different respective task embeddings, and wherein the source prompt is obtained from the prompt database based on determining the source embedding is associated with a target task embedding;

processing the source prompt and the target task data with a pre-trained machine-learned model to generate one or more outputs, wherein the pre-trained machine-learned model comprises a frozen language model;

evaluating a loss function based on the one or more outputs;

adjusting one or more parameters of the source prompt based on the loss function to generate a target prompt, wherein the one or more parameters of the set of parameters are adjusted without adjusting parameters of the pre-trained machine-learned model, and wherein the one or more parameters are adjusted to train the set of parameters for conditioning the pre-trained machine-learned model to perform the target task; and storing the target task embedding and the target prompt in the prompt database.

17. The one or more non-transitory computer-readable media of claim 16, wherein obtaining the source prompt from the prompt database based on the target task data comprises:

processing the target task data with an embedding model to generate the target task embedding;

determining a nearest embedding neighbor for the target task embedding based on a plurality of embeddings stored in the prompt database; and determining the source prompt is associated with the nearest embedding neighbor.

18. The one or more non-transitory computer-readable media of claim 16, wherein the source embedding and the source prompt were generated by training a plurality of source parameters based on a source task dataset associated with the source tasks.

19. The one or more non-transitory computer-readable media of claim 16, wherein the target task comprises an image classification task, wherein the source tasks differ from the target task, and wherein the target prompt is configured to be processed with the pre-trained machine-learned model to perform a target task, and wherein one or more of the group of source tasks is configured to be processed with the pre-trained machine-learned model to perform the source task.

20. The one or more non-transitory computer-readable media of claim 16, wherein the plurality of different respective task embeddings of the prompt database are associated with a semantic space of tasks configured to cluster similar tasks.

* * * * *